(12) United States Patent
Yoshimura et al.

(10) Patent No.: US 12,510,132 B2
(45) Date of Patent: Dec. 30, 2025

(54) FRICTIONAL TRANSMISSION BELT AND PRODUCTION METHOD THEREFOR

(71) Applicant: Mitsuboshi Belting Ltd., Kobe (JP)

(72) Inventors: Kentaro Yoshimura, Hyogo (JP); Masaki Shibata, Hyogo (JP); Hiroki Takechi, Hyogo (JP); Shohei Daiko, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 120 days.

(21) Appl. No.: 17/766,574

(22) PCT Filed: Oct. 14, 2020

(86) PCT No.: PCT/JP2020/038829
§ 371 (c)(1),
(2) Date: Apr. 5, 2022

(87) PCT Pub. No.: WO2021/079809
PCT Pub. Date: Apr. 29, 2021

(65) Prior Publication Data
US 2023/0313861 A1 Oct. 5, 2023

(30) Foreign Application Priority Data

Oct. 24, 2019 (JP) .................................. 2019-193675
Sep. 17, 2020 (JP) .................................. 2020-156394

(51) Int. Cl.
*F16G 5/08* (2006.01)
*D02G 3/44* (2006.01)
*F16G 5/20* (2006.01)

(52) U.S. Cl.
CPC .............. *F16G 5/08* (2013.01); *D02G 3/447* (2013.01); *F16G 5/20* (2013.01); *D10B 2101/12* (2013.01);
(Continued)

(58) Field of Classification Search
CPC .............. F16G 5/20; F16G 5/08; D02G 3/447
(Continued)

(56) References Cited

U.S. PATENT DOCUMENTS 9,169,897 B2 * 10/2015 Fujikawa .................. F16G 5/20
9,506,527 B2 * 11/2016 South ........................ F16G 5/20
(Continued)

FOREIGN PATENT DOCUMENTS

CN 101454592 A 6/2009
CN 103998817 A 8/2014
(Continued)

OTHER PUBLICATIONS

Tensile strength of common materials from the Engineering Toolbox website (Year: 2023).*
(Continued)

*Primary Examiner* — Anna M Momper
*Assistant Examiner* — Juan J Campos, Jr.
(74) *Attorney, Agent, or Firm* — Banner & Witcoff, Ltd.

(57) ABSTRACT

A frictional power transmission belt includes a compression rubber layer having a frictional power transmission surface that is covered with a fabric. The compression rubber layer includes an inner rubber layer in contact with the fabric and an outer rubber layer on an outer peripheral side of the inner rubber layer. The inner rubber layer is formed of a cured product of a rubber composition including a surfactant as a hydrophilic plasticizer, an unsaturated carboxylic acid metal salt, and polyolefin particles.

19 Claims, 4 Drawing Sheets

(52) U.S. Cl.
CPC .... *D10B 2201/02* (2013.01); *D10B 2331/021* (2013.01); *D10B 2401/022* (2013.01); *D10B 2401/063* (2013.01)

(58) Field of Classification Search
USPC .................................. 474/262, 263, 264, 268
See application file for complete search history.

(56) References Cited

U.S. PATENT DOCUMENTS

| | | | |
|---|---|---|---|
| 9,568,070 | B2 | 2/2017 | Rognon et al. |
| 9,695,907 | B2* | 7/2017 | Mitsutomi ............. B29D 29/08 |
| 9,702,434 | B2* | 7/2017 | Takahashi .................. C08J 5/04 |
| 9,752,650 | B2* | 9/2017 | Kojima ...................... F16G 5/08 |
| 10,458,515 | B2 | 10/2019 | Mitsutomi et al. |
| 2006/0154770 | A1* | 7/2006 | Takaba ...................... F16G 5/20 |
| | | | 474/263 |
| 2007/0249451 | A1* | 10/2007 | Wu ........................... F16G 1/28 |
| | | | 474/263 |
| 2010/0167860 | A1 | 7/2010 | Mori et al. |
| 2010/0173740 | A1 | 7/2010 | Mori et al. |
| 2014/0135161 | A1 | 5/2014 | Mori et al. |
| 2014/0296011 | A1* | 10/2014 | Yoshida .................... F16G 5/08 |
| | | | 264/172.19 |
| 2014/0323256 | A1 | 10/2014 | Yoshida |
| 2014/0364260 | A1* | 12/2014 | Takahashi ................ C08K 7/02 |
| | | | 474/263 |
| 2014/0364262 | A1 | 12/2014 | Mori et al. |
| 2015/0024892 | A1 | 1/2015 | Hineno et al. |
| 2015/0276023 | A1 | 10/2015 | Rognon et al. |
| 2015/0285335 | A1* | 10/2015 | Mitsutomi ................ F16G 5/06 |
| | | | 156/137 |
| 2015/0369335 | A1 | 12/2015 | Ishiguro et al. |
| 2017/0241512 | A1 | 8/2017 | Mitsutomi et al. |
| 2018/0326680 | A1 | 11/2018 | Okubo et al. |
| 2019/0030845 | A1 | 1/2019 | Hata et al. |
| 2019/0219134 | A1 | 7/2019 | Kunihiro et al. |

FOREIGN PATENT DOCUMENTS

| | | |
|---|---|---|
| CN | 104160174 A | 11/2014 |
| CN | 105102856 A | 11/2015 |
| CN | 109642640 A | 4/2019 |
| DE | 112012005638 T5 | 10/2014 |
| EP | 2916034 A1 | 9/2015 |
| JP | 2007-144714 A | 6/2007 |
| JP | 2010-242825 A | 10/2010 |
| JP | 2012-045895 A | 3/2012 |
| JP | 2014-111981 A | 6/2014 |
| KR | 2018-0104636 A | 9/2018 |
| KR | 2018-0118788 A | 10/2018 |
| TW | 200745461 A | 12/2007 |
| TW | 200936911 A | 9/2009 |
| WO | 2007-117690 A1 | 10/2007 |
| WO | 2014-056892 A1 | 4/2014 |

OTHER PUBLICATIONS

Science Direct—Surfactant as Plasticizer. Jan. 10, 2007. (Year: 2007).*
JP 2012/045895A Machine Translation (Year: 2012).*
CN 103998817A Machine Translation. (Year: 2014).*
CN 109642640A Machine Translation. (Year: 2019).*
Dec. 8, 2020—International Search Report—Intl App PCT/JP2020/038829.
May 21, 2021—(TW) Office Action—App 109136659.
Mar. 29, 2024—(CN) Office Action—CN App. 202080073410.2, Eng Tran.
Dec. 1, 2023—(KR) Office Action—KR App. 10-2022-7012827, Eng Tran.
Sep. 21, 2023—(EP) Extended EP Search Report—EP App 20878245.8.
Nov. 26, 2024—(KR) Decisiont to Refuse a Patent—KR App 10-2022-7012827, Eng Tran.
Sep. 30, 2024—(CN) Notification of the Second Office Action—CN App. No. 202080073410.2, Eng Tran.
Aug. 19, 2024—(KR) Office Action—KR App. 10-2022-7012827, Eng Tran.
Mar. 25, 2025—(CN) Decision of Rejection—CN App 202080073410.2, Eng Tran.
Jan. 9, 2025—(CN) Notification of the Third Office Action—CN App 202080073410.2, Eng Tran.

* cited by examiner

FRICTIONAL TRANSMISSION BELT AND PRODUCTION METHOD THEREFOR

CROSS REFERENCE TO RELATED APPLICATIONS

This is a U.S. National Phase Application under 35 U.S.C. § 371 of International Application No. PCT/JP2020/038829, filed Oct. 14, 2020, which claims priority to Japanese Application Nos. 2019-193675, filed Oct. 24, 2019, and 2020-156394, filed Sep. 17, 2020, which were published Under PCT Article 21(2), the entire contents of which are incorporated herein by reference.

TECHNICAL FIELD

The present invention relates to a frictional power transmission belt (V-ribbed belt or the like) in which a frictional power transmission surface is covered with a fabric (knitted fabric or the like), and to a method for producing the frictional power transmission belt.

BACKGROUND ART

Power transmission belts are roughly classified into a mesh power transmission belt and a frictional power transmission belt according to the difference in power transmission mechanism. In the mesh power transmission belt, a tooth portion of the belt is mechanically fitted with a groove of a pulley to transmit power. Since no slip occurs between the belt and the pulley in the mesh power transmission belt, it is suitable for synchronous power transmission between a drive side and a driven side. However, since slip is not allowed in the mesh power transmission belt, when an excessive load is generated, the load cannot be released and the belt may be damaged.

On the other hand, in the frictional power transmission belt, power is transmitted between the belt and the pulley via a frictional force. Since some slip is allowed between the belt and the pulley in the frictional power transmission belt, the load can be released even when an excessive load is generated. However, in the frictional power transmission belt, in a case where the pulley is locked or in a case where an excessive load is generated and the belt slips, the belt temperature is likely to rise due to heat generation, and the rubber is likely to deteriorate due to the heat generation. Therefore, in the frictional power transmission belt, in order to improve the durability of the belt, the belt is required to have a property of reducing heat generation (a low heat generation property). Therefore, the mesh power transmission belt and the frictional power transmission belt have different uses, which are good at different power transmission mechanisms, and are used properly according to the purpose.

As the frictional power transmission belt, a flat belt, a V-belt (a wrapped V-belt, a raw-edge V-belt, or the like), a V-ribbed belt, or the like is known. Among these, the V-ribbed belt is widely used for driving an auxiliary machine of automobiles because of being capable of achieving both high power transmission capacity and bending fatigue resistance. In V-ribbed belts, a belt having a surface of a compression rubber layer covered with a fabric has been devised in order to improve wear resistance or adjust a friction coefficient.

For example, Patent Literature 1 discloses a V-ribbed belt in which a surface of a V-rib of a belt body is covered with a knit reinforcing fabric. The literature describes that a rib surface rubber layer is preferably provided between the V-rib of the belt body and the rib-side knit reinforcing fabric, and the rib surface rubber layer preferably contains 5 to 100 parts by mass of a friction coefficient reducing agent with respect to 100 parts by mass of the raw material rubber. Further, examples of the raw material rubber component include ethylene-propylene-diene ternary copolymer (EPDM), and examples of the friction coefficient reducing agent include ultra high molecular weight polyethylene. As an object of the invention, it is described that an excellent effect of preventing generation of abnormal noise during running of the belt is obtained by maintaining a pulley contact portion of the V-ribbed belt in a state of a low friction coefficient without impairing heat resistance.

CITATION LIST

Patent Literature

Patent Literature 1: JP-A-2010-242825

SUMMARY OF INVENTION

Technical Problem

In Patent Literature 1, the generation of abnormal noise in a dry state is evaluated, but the effect of preventing the generation of abnormal noise in a wet state is not evaluated. In the wet state (the state in which water adheres to the frictional power transmission belt), water easily forms a thin film between the frictional power transmission belt and the pulley. When the film of water is formed, a rapid decrease in the friction coefficient occurs, and slip noise is generated. Therefore, even if the effect of preventing the generation of abnormal noise is excellent in the dry state, the generation of abnormal noise may not be effectively prevented in the wet state.

In addition, a friction coefficient reducing agent such as ultra high molecular weight polyethylene has an effect of reducing the friction coefficient to prevent the generation of abnormal noise, but the generation of cracks may increase. It is considered that it is because the friction coefficient reducing agent having a poor adhesive force to the rubber component acts as a foreign matter, and thereby becomes a starting point of a crack. According to the examples of Patent Literature 1, it can be confirmed that a wear rate in a wear test is low by providing a rib surface rubber layer containing ultra high molecular weight polyethylene. However, there are cases where the wear resistance is still insufficient, and further improvement of the wear resistance is also required.

Further, the belt of Patent Literature 1 has a complicated layer structure, and an inner rubber is dissolved in a solvent to form a rubber paste, and then the rubber paste is applied to a rib-side reinforcing fabric. Therefore, the number of man-hours is increased, and the productivity is also low.

An object of the present invention is to provide a frictional power transmission belt excellent in sound emission resistance during water injection, wear resistance, a low heat generation property, and durability (particularly, crack resistance), and a method capable of easily producing such a frictional power transmission belt.

Solution to Problem

As a result of diligent studies to achieve the above problems, the present inventors have found that a compression rubber layer whose surface (frictional power transmission surface) is covered with a fabric (fabric such as knitted fabric) is formed of a specific inner rubber layer in contact with the fabric and an outer rubber layer on an outer peripheral side of the inner rubber layer, whereby sound emission resistance during water injection, wear resistance, a low heat generation property, and durability of a frictional power transmission belt can be improved. Thus, the present invention has been completed.

That is, in the frictional power transmission belt of the present invention, a frictional power transmission surface of a compression rubber layer is covered with a fabric, the compression rubber layer has an inner rubber layer in contact with the fabric and an outer rubber layer on an outer peripheral side of the inner rubber layer, and the inner rubber layer is formed of a cured product of a rubber composition containing a surfactant as a hydrophilic plasticizer, an unsaturated carboxylic acid metal salt, and polyolefin particles. The fabric may contain a cellulose-based fiber. The polyolefin particles may contain ultra high molecular weight polyethylene particles. A thickness ratio of the inner rubber layer to an entire compression rubber layer may be 1% to 50%. The frictional power transmission belt may further include a cord extending in a longitudinal direction of a belt body, and a tensile elastic modulus of fibers constituting the cord may be 50 GPa or more. The outer rubber layer may not contain polyolefin particles. The cord may be formed of at least one of an aramid fiber and a carbon fiber. The frictional power transmission belt may be a belt, which includes a belt body including at least a tension layer forming a belt back surface and the compression rubber layer laminated on an inner peripheral surface of the tension layer and having rib portions extending in a longitudinal direction, a cord embedded in the longitudinal direction of the belt body, and the fabric which is a knitted fabric laminated on the rib portions as the frictional power transmission surface, and may be a V-ribbed belt in particular.

The present invention is a method including: disposing, on a cylindrical inner mold disposed in a hollow cylindrical outer mold, an unvulcanized laminate including an unvulcanized rubber sheet for compression rubber layer and a fabric laminated on the unvulcanized rubber sheet so that the fabric is directed toward the outer mold; pressurizing the unvulcanized laminate at least toward the outer mold to vulcanize the unvulcanized laminate; and demolding a molded body of the vulcanized rubber sheet and the fabric to produce a frictional power transmission belt having a predetermined form. The unvulcanized rubber sheet is formed of an unvulcanized rubber sheet for inner rubber layer in contact with the fabric and an unvulcanized rubber sheet for outer rubber layer on an outer peripheral side of the unvulcanized rubber sheet for inner rubber layer. The present invention also includes a method for producing a frictional power transmission belt in which the unvulcanized rubber sheet for inner rubber layer is formed of a rubber composition containing a surfactant as a hydrophilic plasticizer, an unsaturated carboxylic acid metal salt, and polyolefin particles. In this method, the unvulcanized laminate may be pressurized and vulcanized at a pressure of 1.2 MPa or more. In addition, the unvulcanized rubber sheet for compression rubber layer may be prepared by rolling an unvulcanized rubber sheet with a calender roll to form the unvulcanized rubber sheet for inner rubber layer to be in contact with the fabric, and laminating the unvulcanized rubber sheet for inner rubber layer with the unvulcanized rubber sheet for outer rubber layer on the calender roll. The method may further include: disposing the unvulcanized laminate which is a hollow cylindrical or sleeve-shaped unvulcanized laminate including: an unvulcanized rubber laminated sheet for forming a belt body at least including the unvulcanized rubber sheet for compression rubber layer and an unvulcanized rubber sheet for tension rubber layer laminated or disposed on one surface of the unvulcanized rubber sheet for compression rubber layer; a cord embedded in a longitudinal direction of the unvulcanized rubber laminated sheet; and the fabric which is a knitted fabric laminated or disposed on the other surface of the unvulcanized rubber sheet for compression rubber layer, so that the knitted fabric is directed toward a rib mold of the outer mold; and pressurizing and vulcanizing the unvulcanized laminate with an expansion pressure of a flexible jacket that is mounted on the inner mold and is expandable and contractable.

Advantageous Effects of Invention

In the present invention, since a compression rubber layer whose frictional power transmission surface is covered with a fabric is formed of a specific inner rubber layer in contact with the fabric and an outer rubber layer on an outer peripheral side of the inner rubber layer, sound emission resistance during water injection, wear resistance, a low heat generation property, and durability (particularly, crack resistance) of a frictional power transmission belt can be improved. In particular, when the fabric is formed of water-absorbent fibers such as cellulose-based fibers, the properties can be improved to a high degree. Furthermore, in the frictional power transmission belt, the outer rubber layer is formed of an unvulcanized rubber sheet without using an adhesion rubber layer. Therefore, the layer structure is simple and the coating step is not necessary, the belt can be easily produced.

DESCRIPTION OF EMBODIMENTS

Hereinafter, a frictional power transmission belt according to an embodiment of the present invention is described in detail with reference to the accompanying drawings, if necessary.

[Frictional Power Transmission Belt]

Figure 1:
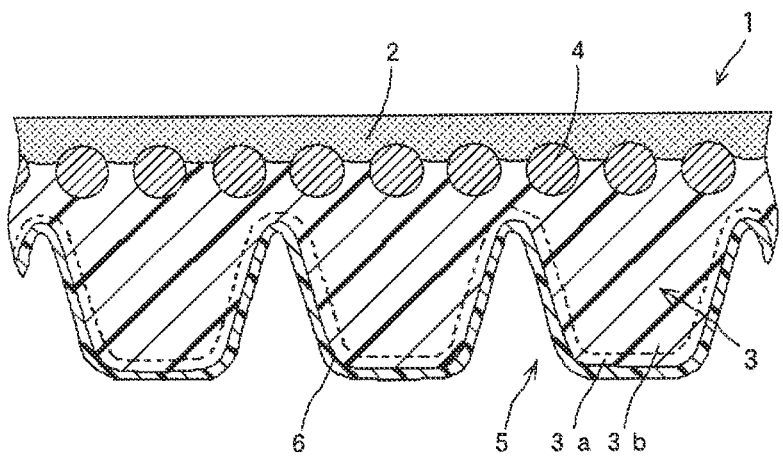
FIG. 1 is a schematic cross-sectional view illustrating an example of a V-ribbed belt as a frictional power transmission belt according to the present invention.

FIG. 1 shows a V-ribbed belt as a frictional power transmission belt 1. The frictional power transmission belt 1 includes a belt body including a tension layer (tension rubber layer in this example) 2 forming a belt back surface (outer peripheral surface of the belt), and a compression rubber layer 3 laminated on an inner peripheral surface of the tension rubber layer. Cords 4 extending in a longitudinal direction (circumferential length direction) of the belt are embedded between the compression rubber layer 3 and the tension rubber layer 2 so as to be arranged side by side at predetermined intervals in a belt width direction. In addition, a plurality of rib portions 5 each having a V-shaped (inverted trapezoidal) cross section are formed on a belt inner peripheral surface of the compression rubber layer 3 by a plurality of inverted V-shaped grooves extending in the longitudinal direction (circumferential length direction) at intervals in the width direction, so as to form the V-ribbed belt. In the V-ribbed belt, two inclined surfaces (two inclined side walls) on both side portions of the rib portions 5 form a frictional power transmission surface. A knitted fabric 6 as a fabric is laminated on the surface of the rib portions 5 as a frictional power transmission surface. The frictional power transmission surface can be brought into contact with a pulley (a pulley having groove portions with which the knitted fabric on both side walls of the rib portions 5 can be brought into contact) via the knitted fabric 6. In this example, the cord (tension member) 4 is formed of a twisted cord, is in contact with the tension rubber layer 2 and the compression rubber layer 3, and is interposed between the two rubber layers 2 and 3.

Then, in this example, the compression rubber layer 3 has a two-layer structure including an inner rubber layer (inner layer or rubber layer in contact with and adhered to the knitted fabric 6) 3a and an outer rubber layer (outer layer or rubber layer adhered to the tension rubber layer 2) 3b, and the inner rubber layer 3a is formed of a cured product of a rubber composition containing a hydrophilic plasticizer, an unsaturated carboxylic acid metal salt, and polyolefin particles. Further, in this example, the thickness of the frictional power transmission belt 1 is about 3 mm to 6 mm, and the thickness of the compression rubber layer 3 (thickness to the top of the rib portion) is about 1.5 mm to 5 mm. The thickness of the inner rubber layer (inner layer) 3a is smaller than that of the outer rubber layer (outer layer) 3b, and is formed to have a thickness of about 0.1 mm to 0.5 mm. That is, the inner rubber layer 3a is formed to have a thickness of about 5% to 20% with respect to the thickness of the compression rubber layer 3 (thickness to the top of the rib portion).

In the frictional power transmission belt, the compression rubber layer 3 is formed in a two-layer structure, and the inner rubber layer is formed of a cured product of a specific rubber composition. Therefore, the sound emission resistance during water injection, the wear resistance, and the durability can be improved in a balanced manner. In addition, no adhesion rubber layer is provided and the thin inner rubber layer 3a can also be produced from the unvulcanized rubber sheet. Therefore, the number of producing man-hours of the belt can be reduced, and the productivity can be improved. Furthermore, since the frictional power transmission surface is covered with the knitted fabric 6, the power friction transmission properties can be stabilized, and the generation of abnormal noise can be prevented even when it is exposed to water and/or it is deteriorated. Moreover, the sound emission limit tension can be reduced, and sound emission (abnormal noise) can be effectively prevented and sound emission resistance can be improved even when the belt tension is low. In particular, when the knitted fabric 6 is formed of cellulose-based fibers, the sound emission resistance during water injection can be improved to a high degree.

The frictional power transmission belt of the present invention is not limited to the V-ribbed belt having the structure shown in the drawings, and may be a flat belt, a V-belt, or the like. For example, the rib portion of the frictional power transmission surface is not necessarily required. The tension layer may be formed of a fabric (cover fabric made of fiber members such as woven fabrics, knitted fabrics, and non-woven fabrics) instead of the tension rubber layer (rubber composition), and a fabric (canvas) may be laminated on the outer peripheral surface of the tension rubber layer. An adhesion rubber layer may be interposed between the compression rubber layer and the tension layer (or tension rubber layer). The cord may be embedded in this adhesion rubber layer. In addition, the cord may be embedded between the compression rubber layer and the tension layer (or tension rubber layer). For example, the cord may be embedded in the compression rubber layer, or may be embedded in the compression rubber layer while being in contact with the tension layer. The cord may be embedded in the adhesion rubber layer, or may be embedded between the compression rubber layer and the adhesion rubber layer or between the adhesion rubber layer and the tension layer. In a preferred example of the present invention, as described above, since the durability of the belt can be improved without interposing the adhesion rubber layer, the productivity of the belt can also be improved. The bendability of the frictional power transmission belt may be improved by forming a concave and convex portion (for example, a curved concave and convex cog portion) extending in the width direction of the belt, but such a concave and convex portion (cog portion) is not necessarily required. Further, if necessary, a fabric (canvas) may be laminated on the compression rubber layer via a rubber layer, but usually, a fabric (fiber member such as a knitted fabric) is directly laminated on the compression rubber layer.

In a preferred example, the rib portion extending in the longitudinal direction (circumferential length direction) is formed on the inner peripheral surface of the compression rubber layer, and the surface of the rib portion is directly covered with the fabric. A preferred frictional power transmission belt is a V-ribbed belt. The V-ribbed belt includes: a tension layer for forming the outer peripheral surface of the belt (or an tension rubber layer in which a fabric may be laminated on the outer peripheral surface); a compression rubber layer laminated on the inner peripheral surface of the tension layer; a cord extending spirally in the longitudinal direction (circumferential length direction) of the belt and embedded between the tension layer and the compression rubber layer; a plurality of rib portions formed on the inner peripheral surface of the compression rubber layer at intervals in the width direction and extending in the longitudinal direction (inner peripheral direction); and a fabric covering the inner peripheral surface including the rib portions (frictional power transmission surface including both side walls of each rib portion), in which the cord may be embedded in an adhesion rubber layer interposed between the tension layer and the compression rubber layer. However, from the viewpoint of productivity, it is preferable that the adhesion rubber layer is not interposed.

A V-belt is a frictional power transmission belt that transmits friction by bringing both side walls of the belt into contact with the V-shaped inner wall of the pulley. In a variable speed V-belt (raw-edge cogged V-belt) described in JP-A-H09-317831, etc., cog portions extending in the width direction are formed at intervals in the longitudinal direction in order to improve the bendability. In such a V-belt (variable speed belt), both side walls of the belt serve as frictional power transmission surfaces, and the contact area between the bottom fabric disposed on the lower surface of the compression rubber layer and the V-shaped inner wall of the pulley is extremely small. In contrast, in the V-ribbed belt, the fabric on both side walls of the rib portion comes into direct contact with both side walls of the V-shaped groove (usually, a plurality of V-shaped grooves formed at intervals in the width direction) of the pulley to transmit power. Therefore, in the V-ribbed belt, when rubber bleeds out from the fabric on both side walls (frictional power transmission surface) of the rib portion, the power friction transmission properties become unstable and sound is generated. Thus, unlike the V-belt, which has an extremely small contact area between both side walls of the V-shaped groove of the pulley and the bottom fabric, in the V-ribbed belt, the fabric on both side walls of the rib portion comes into direct contact with the V-shaped groove of the pulley over a large area. Therefore, the bleeding-out of the rubber from the fabric greatly influences the sound emission property of the belt during running.

Hereinafter, each member constituting the frictional power transmission belt and a method for producing the belt is described in detail.

[Fabric]

By covering the inner peripheral surface of the compression rubber layer with a fabric, the durability and the sound emission resistance of the frictional power transmission belt can be improved. In particular, the power friction transmission properties can be stabilized, and the sound emission resistance can be improved even when the belt tension is low. As the fabric, fiber members such as a woven fabric (woven member), a knitted fabric (knitted member), and a non-woven fabric can be used, and a knitted fabric (or canvas) is often used. The knitted fabric is formed of water-absorbent fibers and/or non-water-absorbent fibers. From the viewpoints of improving the sound emission resistance when exposed to water, a knitted fabric formed of water-absorbent fibers (or hydrophilic fibers) and non-water-absorbent fibers (for example, the knitted fabric described in JP-A-2016-70494) may be used. Cellulose-based fibers are excellent in water absorbency and can improve the sound emission resistance during water injection, but have low wear resistance. Therefore, in a preferred example of the present invention, as is described later, the wear resistance can be improved by the combination with the unsaturated carboxylic acid metal salt contained in the inner layer of the compression rubber layer.

Examples of the water-absorbent fibers or the hydrophilic fibers (or fibers containing water-absorbent yarns) include vinyl alcohol-based fibers (polyvinyl alcohol, ethylene-vinyl alcohol polymer fibers, vinylon, etc.), polyamide fibers (aliphatic polyamide fibers such as polyamide 6 fibers, polyamide 66 fibers, polyamide 46 fibers, etc.), cellulose-based fibers [cellulose fibers (cellulose fibers derived from plants such as cotton and hemp, animals or bacteria), fibers of cellulose derivatives such as rayon and acetate], and animal-derived fibers (wool, silk, etc.). These water-absorbent fibers can be used alone or in combination of two or more thereof. Among these water-absorbent fibers, cellulose fibers (particularly cotton fibers) are preferred.

The cellulose-based fibers may be spun yarns. The thickness (yarn count) of the cellulose-based fibers is, for example, about 5 to 100, preferably about 10 to 80, and more preferably about 20 to 70 (particularly, about 30 to 50). When the thickness is too small, the mechanical properties of the knitted fabric may decrease, and when the thickness is too large, the water absorbency may decrease. Preferred cellulose-based fibers are cellulose fibers.

Examples of the non-water-absorbent fiber include: synthetic fibers such as polyolefin fibers (polyethylene fibers (including high-strength polyethylene fibers), polypropylene fibers, etc.), non-absorbent polyamide fibers (aromatic polyamide fibers such as aramid fibers), acrylic fibers, polyester fibers [$C_{2-4}$ alkylene $C_{6-14}$ allylate fibers such as polyethylene terephthalate (PET) fibers, polypropylene terephthalate (PPT) fibers, polytrimethylene terephthalate (PTT) fibers, polybutylene terephthalate (PBT) fibers, and polyethylene naphthalate (PEN) fibers, and polyarylate fibers], polyparaphenylene benzobisoxazole (PBO) fibers, and polyurethane fibers; and inorganic fibers such as carbon fibers. These non-water-absorbent fibers can be used alone or in combination of two or more thereof. Among these non-water-absorbent fibers, composite fibers (composite yarns), for example, composite fibers of synthetic fibers (composite yarns of synthetic fibers) may be used, and in order to improve the wear resistance of the knitted fabric and prevent the rubber from bleeding out to the frictional power transmission surface (or the surface of the knitted fabric), bulky textured yarns or bulky composite yarns (such as polyester-based composite yarns such as PTT/PET conjugate yarns) having a large cross-sectional bulk are preferred.

The fineness of the non-water-absorbent fibers may be, for example, about 20 dtex to 600 dtex, preferably about 50 dtex to 300 dtex, and more preferably about 60 dtex to 200 dtex (particularly about 70 dtex to 100 dtex).

The fabric (knitted fabric, etc.) preferably contains at least water-absorbent fibers (particularly cellulose-based fibers). The proportion of the non-water-absorbent fibers may be selected from the range of, for example, 200 parts by mass or less (for example, 0 to 200 parts by mass) with respect to 100 parts by mass of the water-absorbent fibers, and is, for example, about 1 to 100 parts by mass, preferably about 3 to 80 parts by mass (for example, 5 to 50 parts by mass), and more preferably about 10 to 40 parts by mass (particularly 20 to 30 parts by mass). When the proportion of the non-water-absorbent fibers is too large, the water absorbency of the knitted fabric may decrease, and the sound emission resistance when exposed to water may decrease.

The structure of the knitted fabric is not particularly limited, and a common structure can be used. A single layer weft knit [for example, a weft knit in which a flat knit (plain knit) is used as a knitted structure] or a multilayer knitted fabric [for example, a moss stitch knit (a weft knit in which a moss stitch knit is used as a knitted structure)] is preferred, and a multilayer knitted fabric is particularly preferred. In the multilayer knitted fabric, the number of layers of the knitted fabric may be, for example, 2 to 5, preferably 2 to 4, and more preferably 2 or 3.

The density of fibers or yarns of the knitted fabric may be, for example, 30 fibers or yarns/inch or more (for example, 32 to 70 fibers or yarns/inch, preferably 34 to 60 fibers or yarns/inch, and more preferably 35 to 55 fibers or yarns/inch) in each of a wale direction and a course direction. In addition, the total density of fibers or yarns may be 60 fibers/inch or more (for example, 62 to 120 fibers or yarns/inch, preferably 70 to 115 fibers or yarns/inch, more preferably 80 to 110 fibers or yarns/inch, and particularly preferably 90 to 105 fibers or yarns/inch).

The bulkiness of the fabric or fiber member (for example, a knitted fabric in which a composite yarn such as a bulky textured yarn as a synthetic fiber is knitted) can be selected within a range in which bleeding-out of the rubber can be prevented, and may be, for example, about 2 cm$^3$/g to 4.5 cm$^3$/g (for example, 2.2 cm$^3$/g to 4 cm$^3$/g), preferably about 2.3 cm$^3$/g to 3.8 cm$^3$/g (for example, 2.4 cm$^3$/g to 3.5 cm$^3$/g), and more preferably about 2.5 cm$^3$/g to 3.3 cm$^3$/g. The bulkiness (cm$^3$/g) can be calculated by dividing the thickness (cm) of the knitted fabric by the mass per unit area (g/cm$^2$).

The fabric (knitted fabric, etc.) may have a basis weight of, for example, about 50 g/m$^2$ to 500 g/m$^2$, preferably about 80 g/m$^2$ to 400 g/m$^2$, and more preferably about 100 g/m$^2$ to 350 g/m$^2$.

The thickness (average thickness) of the fabric (knitted fabric, etc.) can be selected from the range of about 0.1 mm to 5 mm, and may be, for example, about 0.3 mm to 3 mm (for example, 0.4 mm to 2 mm), and preferably about 0.5 mm to 1.5 mm (for example, 0.7 mm to 1.2 mm).

In order to improve the adhesiveness to the frictional power transmission surface, the fabric (knitted fabric, etc.) may be subjected to an adhesion treatment, if necessary. The adhesion treatment can also improve the wear resistance of the frictional power transmission surface (power transmission surface). Examples of the adhesion treatment include: a method of immersing in a treatment liquid obtained by dissolving an adhesive component (for example, an epoxy compound or an isocyanate compound) in an organic solvent (toluene, xylene, methyl ethyl ketone, etc.) and then performing heating and drying; and a method of immersing in a resorcin-formalin-latex liquid (RFL treatment liquid) and then performing heating and drying. These methods can be performed alone or in combination, and the treatment order and the number of treatments are not limited.

The fabric (knitted fabric, etc.) may contain commonly used additives such as a surfactant, a dispersant, a filler, a colorant, a stabilizer, a surface treatment agent, and a leveling agent on the fiber surface or inside the fibers. As the surfactant, for example, a hydrophilic plasticizer (hydrophilic treatment agent) described later can be used. These additives can be used alone or in combination of two or more thereof. The proportion of the additive may be 10 mass % or less, for example, about 0.01 mass % to 5 mass %, preferably about 0.1 mass % to 3 mass %, and more preferably about 0.5 mass % to 2 mass % with respect to the entire fabric (knitted fabric, etc.). The treated amount (content) of the surfactant may be about 0.1 g to 200 g (for example, 1 g to 150 g), and preferably about 3 g to 100 g (for example, 5 g to 60 g) per 1 m$^2$ of the fabric.

[Inner Layer of Compression Rubber Layer]

Examples of a rubber component of an unvulcanized rubber composition forming the inner layer (inner rubber layer) include diene rubbers (natural rubber, isoprene rubber, butadiene rubber, chloroprene rubber, butyl rubber, styrene-butadiene rubber (SBR), vinylpyridine-styrene-butadiene rubber, acrylonitrile-butadiene rubber (nitrile rubber: NBR), acrylonitrile-chloroprene rubber, hydride nitrile rubber (HNBR), etc.), ethylene-α-olefin elastomers, chlorosulfonated polyethylene rubbers (CSM), alkylated chlorosulfonated polyethylene rubbers (ACSM), epichlorohydrin rubbers, acrylic rubbers, silicone rubbers, urethane rubbers, and fluororubbers. These rubber components may be carboxylated, such as carboxylated SBR and carboxylated NBR. These rubber components can be used alone or in combination of two or more thereof.

A preferred rubber component contains at least an ethylene-α-olefin elastomer (or ethylene-α-olefin rubber) such as an ethylene-propylene copolymer (EPM) and an ethylene-propylene-diene ternary copolymer (EPDM) as a main component. These ethylene-α-olefin elastomers can be used alone or in combination of two or more thereof. Further, an ethylene-propylene-diene ternary copolymer such as EPDM is preferred from the viewpoint of obtaining excellent heat resistance, cold resistance, and durability.

The diene content of the ethylene-α-olefin elastomer is, for example, about 0.5 mass % to 3.5 mass %, preferably about 1 mass % to 3 mass %, and more preferably about 1.5 mass % to 2.8 mass % (particularly 2 mass % to 2.5 mass %). When the diene content is too small, the crosslinking density may decrease and the strength of the rubber may decrease. On the contrary, when the diene content is too large, the Mooney viscosity may decrease and the sound emission resistance may decrease. In the present application, the diene content can be measured according to the standard test method of ASTM D6047-17.

The rubber component may be formed only of an ethylene-α-olefin elastomer (or ethylene-α-olefin rubber), and an ethylene-α-olefin elastomer (or ethylene-α-olefin rubber) as a first rubber component may be combined with another rubber component (second rubber component). The proportion of the second rubber component may be 50 parts by mass or less (for example, about 1 to 40 parts by mass, and preferably about 5 to 30 parts by mass) with respect to 100 parts by mass of the ethylene-α-olefin elastomer (first rubber component).

The Mooney viscosity (ML (1+4) 125° C.) of the unvulcanized rubber component (ethylene-α-olefin elastomer, etc.) is, for example, about 20 to 80, preferably about 30 to 70, and more preferably about 40 to 60 (particularly about 45 to 50). In the present application, the Mooney viscosity can be measured by a method according to JIS K6300-1 (2013), and the test conditions include an L-shaped rotor, a test temperature of 125° C., a preheating time of 1 minute, and a rotor operating time of 4 minutes.

The proportion of the rubber component (particularly, the ethylene-α-olefin elastomer) to the entire inner layer (or the total amount of the rubber composition) may be, for example, about 20 mass % or more (for example, about 25 mass % to 80 mass %), preferably about 35 mass % to 75 mass % (for example, 40 mass % to 70 mass %), and more preferably about 45 mass % to 65 mass % (for example, 50 mass % to 60 mass %).

(Hydrophilic Plasticizer)

The rubber composition forming the inner layer further contains a hydrophilic plasticizer (hydrophilic treatment agent or surfactant). When the rubber composition (inner layer) contains a hydrophilic plasticizer (or a hydrophilic agent), since the hydrophilic plasticizer gradually bleeds out to the frictional power transmission surface with the passage of time, the water absorbency of the fabric can be increased and the sound emission resistance during water injection can be improved. The sustainability of this effect is particularly effective when a hydrophilic plasticizer is also contained in the outer layer described later. In JP-A-2014-209028 etc., a hydrophilic treatment agent (surfactant) is adhered to the fabric to increase the water absorbency and to improve the sound emission resistance during water injection. However, in this method, the number of treatment steps (spraying, coating, dipping, application and drying steps) for adhering the hydrophilic plasticizer (hydrophilic treatment agent or surfactant) to the fabric has increased, and the productivity is decreased. Also, the hydrophilic plasticizer (hydrophilic treatment agent) adhering to the fabric may flow out relatively easily upon contact with water, and the sound emission resistance during water injection may disappear within a short period of time. In contrast, when the hydrophilic plasticizer is contained in the rubber composition, the hydrophilic plasticizer does not flow out within a short period of time, and high sound emission resistance during water injection can be maintained for a long period of time. Further, since the rubber composition is blended with the hydrophilic plasticizer, it is not necessary to provide a new step, the number of man-hours can be reduced, and the productivity can be improved.

When the rubber composition forming the inner layer contains a hydrophilic plasticizer (hydrophilic agent or surfactant), and the water-absorbent fiber (particularly, cellulose-based fiber) of the fabric is combined with the hydrophilic plasticizer (hydrophilic agent or surfactant) that bleeds out to the frictional power transmission surface, the hydrophilic plasticizer reduces the surface tension of water droplets adhering to the frictional power transmission surface. Therefore, it is possible to spread water droplets to improve the wettability on the frictional power transmission surface (the affinity between water and the water-absorbent fiber is promoted), and to improve the water absorption efficiency and sound emission resistance during water injection by the water-absorbent fiber.

Examples of the hydrophilic plasticizer (or surfactant) include an ionic surfactant (anionic surfactant, cationic surfactant, and amphoteric surfactant), and a nonionic surfactant. The nonionic surfactant may be, for example, a polyethylene glycol type (polyoxyethylene type) nonionic surfactant and a polyhydric alcohol type nonionic surfactant.

The polyethylene glycol type nonionic surfactant is a nonionic surfactant in which ethylene oxide is added to a hydrophobic base component having a hydrophobic group, such as a higher alcohol, an alkyl phenol, a higher fatty acid, a polyhydric alcohol higher fatty acid ester, a higher fatty acid amide and polypropylene glycol, to impart a hydrophilic group thereto.

Examples of the higher alcohol as the hydrophobic base component include $C_{10-30}$ saturated alcohols such as lauryl alcohol, tridecyl alcohol, tetradecyl alcohol, cetyl alcohol, octadecyl alcohol and aralkyl alcohol, and $C_{10-26}$ unsaturated alcohols such as oleyl alcohol. Examples of the alkyl phenol include $C_{4-16}$ alkyl phenols such as octyl phenol and nonyl phenol. These higher alcohols may be used alone or in combination of two or more thereof.

Examples of the higher fatty acid as the hydrophobic base component include saturated fatty acids [for example, $C_{10-30}$ saturated fatty acids such as myristic acid, palmitic acid, stearic acid, arachidic acid, behenic acid, lignoceric acid, cerotic acid, and montanoic acid, preferably $C_{12-28}$ saturated fatty acids, more preferably $C_{14-26}$ saturated fatty acids, and particularly preferably $C_{16-22}$ saturated fatty acids; oxycarbonic acids such as hydroxystearic acid; etc.], and unsaturated fatty acids [for example, $C_{10-30}$ unsaturated fatty acids such as oleic acid, erucic acid, linolic acid, linolenic acid, and eleostearic acid, etc.]. These higher fatty acids may be used alone or in combination of two or more thereof.

The polyhydric alcohol higher fatty acid ester is an ester of a polyhydric alcohol and the above higher fatty acid, and contains an unreacted hydroxy group. Examples of the polyhydric alcohol include alkanediols ($C_{2-10}$ alkanediols such as ethylene glycol, propylene glycol and butanediol), alkanetriols (such as glycerin, trimethylolethane, and trimethylolpropane), alkanetetraols (such as pentaerythritol and diglycerine), alkanehexaols (such as dipentaerythritol, sorbitol, sorbit, and triglycerin), alkaneoctaols (such as sucrose), and alkylene oxide adducts thereof (such as $C_{2-4}$ alkylene oxide adducts).

Hereinafter, "oxyethylene", "ethylene oxide" or "ethylene glycol" is represented by "EO", and "oxypropylene", "propylene oxide" or "propylene glycol" is represented by "PO". Specific examples of the polyethylene glycol type nonionic surfactant include: poly EO higher alcohol ethers (poly EO $C_{10-26}$ alkyl ethers such as poly EO lauryl ether and poly EO stearyl ether); poly EO poly PO higher alcohol ether (e.g., poly EU poly PO $C_{10-26}$ alkyl ether); alkyl phenol-EO adducts such as poly EU octyl phenyl ether and poly EO nonyl phenyl ether; fatty acid-EO adducts such as poly EO monolaurate, poly EO monooleate, and poly EU monostearate; glycerin mono- or di-higher fatty acid ester-EO adducts (EO adducts of glycerin mono- or di-$C_{10-26}$ fatty acid ester such as glycerin mono- or di-laurate, glycerin mono- or di-palmitate, glycerin mono- or di-stearate, and glycerin mono- or di-olate); pentaerythritol higher fatty acid ester-EO adducts (pentaerythritol mono- to tri-$C_{10-26}$ fatty acid ester-EO adducts such as a pentaerythritol distearate-EO adduct); a dipentaerythritol higher fatty acid ester-EO adduct, a sorbitol higher fatty acid ester-EO adduct, sorbitan fatty acid ester-EO adducts such as poly EO sorbitan monolaurate, poly EO sorbitan monostearate, and poly EU sorbitan tristearate; polyhydric alcohol fatty acid ester-EO adduct such as a sucrose higher fatty acid ester-EO adduct; higher alkylamine-EO adducts such as poly EO laurylamino ether and poly EO stearylamino ether; fatty acid amide-EO adducts such as poly EU coconut fatty acid monoethanolamide, poly EO lauric acid monoethanolamide, poly EO stearic acid monoethanolamide, and poly EO oleic acid monoethanolamide; oil-EO adducts such as poly EO castor oil and poly EO hardened castor oil; and poly PO-EO adducts (such as a poly EO-poly PO block copolymer). These polyethylene glycol type nonionic surfactants may be used alone or in combination of two or more thereof.

The polyhydric alcohol type nonionic surfactant is a nonionic surfactant in which a hydrophobic group of higher fatty acid or the like is combined with the above polyhydric alcohol (particularly alkanetriols to alkanehexaols such as glycerol, diglycerin, pentaerythritol, sucrose and sorbitol). Examples of the polyhydric alcohol type nonionic surfactant include glycerin fatty acid esters such as glycerin monostearate and glycerin monooleate, polyglycerin fatty acid esters such as diglycerin monostearate, pentaerythritol fatty acid esters such as pentaerythritol monostearate and pentaerythritol di-tallow acid ester, sorbitan fatty acid esters such as sorbitan monolaurate and sorbitan monostearate, sorbitol fatty acid ethers such as sorbitol monostearate, sucrose fatty acid esters, alkyl ethers of polyhydric alcohols, fatty acid amides of alkanolamines such as coconut oil fatty acid diethanolamide, and alkyl polyglycosides. These polyhydric alcohol type nonionic surfactants may be used alone or in combination of two or more thereof, or may be used in combination with the above polyethylene glycol type nonionic surfactant.

The ionic surfactant may be an anionic surfactant such as sulfonates (alkylbenzene sulfonate, α-olefin sulfonate, alkane sulfonate, etc.), sulfates (alkyl sulfates, poly EO alkyl ether sulfates, etc.), long chain fatty acid salts, naphthalene sulfonic acid formalin condensates, phosphate esters (aliphatic phosphate type, aromatic phosphate type, alkyl phosphate, etc.), and sulfosuccinate ester salts, a cationic surfactants such as alkyltrimethylammonium salts, dialkyldimethylammonium salts, or an amphoteric surfactant such as alkyl betaine and imidazoline derivatives.

Preferred surfactants are nonionic surfactants, particularly polyethylene glycol type nonionic surfactants. Therefore, the hydrophilic plasticizer (or surfactant) may contain at least a nonionic surfactant (particularly, a polyethylene glycol type nonionic surfactant).

The hydrophile-lipophile-balance (HLB) value of the surfactant is not particularly limited, and may be about 5 to 15, preferably about 7 to 15 (for example, 8 to 14), and more preferably about 10 to 14 (for example, 11 to 13). By adjusting the HLB value, the degree of bleeding out from the compression rubber layer can be adjusted.

Further, the surfactant is not particularly limited, and may have a boiling point higher than the vulcanization temperature of the rubber. The melting point of the surfactant is lower than or equal to room temperature, for example, about −40° C. to 20° C. (for example, −35° C. to 10° C.), and preferably about −35° C. to 5° C. (for example, −30° C. to −5° C.), and may be generally 0° C. or lower. The surfactant may generally be liquid at room temperature (20° C. to 25° C.). By adjusting the melting point, the degree of bleeding out from the compression rubber layer may be adjusted.

In the rubber composition forming the inner layer, the proportion of the hydrophilic plasticizer can be selected from the range of about 0.1 to 20 parts by mass (for example, 1 to parts by mass) with respect to 100 parts by mass of the rubber component (particularly, ethylene-α-olefin elastomer), and may be generally about 1.5 to 12 parts by mass (for example, 2 to 10 parts by mass), preferably about 2.5 to 8 parts by mass (for example, 3 to 7 parts by mass), and more preferably, and more preferably about 4 to 6 parts by mass. When the proportion of the hydrophilic plasticizer is too small, the sound emission resistance during water injection cannot be significantly improved, and when the proportion is too large, the crack resistance of the belt and the adhesiveness between layers may decrease.

(Unsaturated Carboxylic Acid Metal Salt and Polyolefin Particles)

The rubber composition forming the inner layer further contains an unsaturated carboxylic acid metal salt and polyolefin particles in addition to the hydrophilic plasticizer. In the present invention, it has been found that when components of both an unsaturated carboxylic acid metal salt and polyolefin particles is contained in the rubber composition forming the inner layer, the wear resistance of the fabric can be improved and the sound emission resistance can be maintained for a long period of time. The mechanism of such an effect is not clear, and at first glance, since the frictional power transmission surface of the compression rubber layer is covered with a fabric, it seems that there is no relation between the wear of the fabric and the blending formulation of the rubber composition. However, it is presumed that since, in practice, the rubber composition penetrates between the fibers of the fabric (knitted fabric, etc.) and holds the fibers of the fabric to firmly fix or bond the fabric, the fibers of the fabric (knitted fabric, etc.) is prevented from falling off from the surface of the compression rubber layer and the wear resistance is improved. Furthermore, it can be assumed that the polyolefin particles decrease the friction coefficient and improve the wear resistance, and the unsaturated carboxylic acid metal salt acts as a co-crosslinking agent and can firmly hold the fabric, thereby improving the wear resistance. Particularly, in a fabric (knitted fabric, etc.) containing hydrophilic fibers (cellulose-based fiber, etc.) capable of improving water absorbency, the hydrophilic fibers are easily worn. Particularly, cellulose-based fibers are more likely to be worn than many synthetic fibers. However, when an unsaturated carboxylic acid metal salt and polyolefin particles are contained in the rubber composition, the wear resistance of the fabric (knitted fabric, etc.) can be improved without considering the structure of the knitted fabric such as a warp knit or the impregnation of the resin into the fabric. In addition, the unsaturated carboxylic acid metal salt can improve the crack resistance.

Examples of the unsaturated carboxylic acid of the unsaturated carboxylic acid metal salt include monocarboxylic acids such as (meth)acrylic acid and crotonic acid, dicarboxylic acids such as maleic acid, fumaric acid, and itaconic acid, and monoalkyl esters of these dicarboxylic acids. These unsaturated carboxylic acids can be used alone or in combination of two or more thereof. A preferred unsaturated carboxylic acid is (meth)acrylic acid. Examples of the metal of the unsaturated carboxylic acid metal salt include polyvalent metals, for example, Group 2 elements in the periodic table (magnesium, calcium, etc.), Group 4 elements in the periodic table (titanium, zirconium, etc.), and Groups 8 to 14 elements in the periodic table (iron, cobalt, nickel, copper, zinc, aluminum, tin, lead, etc.). These metals can be used alone or in combination of two or more thereof. Preferred metals are Group 2 elements in the periodic table (magnesium, etc.), Group 12 elements of the periodic table (zinc, etc.) and the like.

Examples of the preferred unsaturated carboxylic acid metal salt include polyvalent metal salts of (meth)acrylic acid, such as zinc (meth)acrylate and magnesium (meth)acrylate. Among these, polyvalent metal salts of methacrylic acid such as zinc methacrylate are particularly preferable. These unsaturated carboxylic acid metal salts can be used alone or in combination of two or more thereof.

Examples of an olefin-based resin forming the polyolefin particles include a homopolymer or copolymer containing ethylene and/or polypropylene as a main monomer, for example, polyethylene-based resins (low density polyethylene, high density polyethylene, linear low density polyethylene, ultra high molecular weight polyethylene, etc.), polypropylene-based resin (isotactic, syndiotactic, atactic polypropylene, etc.), ethylene-propylene copolymers (an ethylene-propylene copolymer containing ethylene as a main monomer and a propylene-ethylene copolymer containing propylene as a main monomer), and copolymers of ethylene and/or propylene with copolymerizable monomer (at least one monomer selected from $\alpha$-$C_{4-12}$ olefins such as butene, (meth)acrylic monomers such as methyl methacrylate, halogen-containing vinyl monomers such as vinyl chloride, and the like). The polyolefin-based resin may be a metallocene-based polyolefin using a metallocene catalyst. The amount of the copolymerizable monomer used may be about 0 mol % to 20 mol % (for example, 1 mol % to 10 mol %) with respect to the total amount of monomers. These polyolefin particles can be used alone or in combination of two or more thereof. Preferred polyolefin particles are usually formed of a polyethylene having high wear resistance, for example, a low density polyethylene and an ultra high molecular weight polyethylene. Among these, ultra high molecular weight polyethylene is particularly preferable.

The viscosity average molecular weight (Mv) of the ultra high molecular weight polyethylene may be, for example, 1,000,000 or more, and is preferably 3,000,000 or more (for example, about 3,000,000 to 30,000,000) from the viewpoint of improving the wear resistance. In the present application, the viscosity average molecular weight of the ultra high molecular weight polyethylene can be obtained based on the following equation.

$$\text{Viscosity average molecular weight } Mv = 5.37 \times 10^4 [\mu]^{1.49}$$

(In the equation, [μ] represents an intrinsic viscosity).

In the above equation, the intrinsic viscosity (intrinsic viscosity number) can be measured by an Ubbelohde viscometer using decalin (decahydronaphthalene) as a solvent at a temperature of 135° C. in accordance with JIS K7367-1(2002).

The shape of the polyolefin particles may be an amorphous shape, a columnar shape, an ellipsoidal shape, a spherical shape, or the like, and is generally spherical in many cases. The average particle size of the polyolefin particles may be, for example, about 0.1 μm to 300 μm (for example, 1 μm to 250 μm), preferably about 5 μm to 200 μm (for example, 10 μm to 170 μm), and more preferably about 15 μm to 150 μm (for example, 20 to 120 μm), or may be about 50 μm to 250 μm (for example, 70 μm to 220 μm), and preferably about 80 μm to 200 μm (for example, 100 μm to 150 μm). When the particle diameter is too small, the wear resistance may be reduced, and when the particle diameter is too large, the crack resistance may be reduced. Polyolefin particles having different average particle sizes may be used in combination. The average particle size of the polyolefin particles can be measured on a volume basis using a laser diffraction scattering method.

The proportion of the unsaturated carboxylic acid metal salt can be selected from the range of about 0.5 to 30 parts by mass (for example, about 1 to 20 parts by mass) with respect to 100 parts by mass of the rubber component forming the inner layer (particularly, ethylene-α-olefin elastomer), and may be generally about 2 to 10 parts by mass, preferably about 3 to 8 parts by mass, and more preferably about 3 to 7 parts by mass (particularly, about 4 to 6 parts by mass). When the content of the unsaturated carboxylic acid metal salt is too small, the wear resistance and the crack resistance of the fabric cannot be improved so much, and when the content is too large, the crack resistance may decrease.

A commercially available product (rubber alloy) containing an unsaturated carboxylic acid metal salt may be used as the rubber component. The mass ratio of the rubber component and the unsaturated carboxylic acid metal salt may be prepared by mixing with a commercially available rubber in consideration of the content of the unsaturated carboxylic acid metal salt of the commercially available product.

The proportion of the polyolefin particles can be selected from the range of about 1 to 40 parts by mass (for example, 2 to 35 parts by mass) with respect to 100 parts by mass of the rubber component forming the inner layer (particularly, the ethylene-α-olefin elastomer), and generally may be about 5 to 30 parts by mass (for example, 7 to 25 parts by mass), preferably about 7 to 20 parts by mass (for example, 8 to 15 parts by mass), and more preferably about 5 to 15 parts by mass (particularly, 7.5 to 12.5 parts by mass). When the content of the polyolefin particles is too small, the wear resistance of the fabric cannot be improved so much, and when the content is too large, the crack resistance of the belt and the adhesiveness between layers may decrease.

(Reinforcing Agent)

The rubber composition forming the inner layer may contain carbon black and/or silica as a reinforcing agent (reinforcing filler).

The carbon black is classified into "N0" to "N9" by ASTM (classified based on the iodine adsorption amount), and is conventionally classified into SAF, HAF, GPF, etc. based on the performance of rubber products. N110 (SAF), N220 (ISAF), N330 (HAF) and the like which have a small primary particle diameter, are sometimes called hard carbon, and N550 (FEF), N660 (GPF), N762 (SRF) and the like having a large primary particle diameter are sometimes referred to as soft carbon.

The average particle diameter (average primary particle diameter) of carbon black may be, for example, about 5 nm to 200 nm (for example, 10 nm to 150 nm), preferably about nm to 120 nm (for example, 20 nm to 100 nm), and more preferably about 25 nm to 100 nm (for example, 30 nm to 80 nm). When the average particle diameter of carbon black is too small, the torque loss may become large, and when the average particle diameter is too large, the mechanical properties of the belt body may deteriorate. The carbon black can be used alone or in combination.

In many cases, at least carbon black (hard carbon) having a small primary particle diameter is used as the carbon black to improve the reinforcing property for rubber, the hardness and the wear resistance of the rubber, and the durability of the belt (power transmission property under high load). The average primary particle diameter of carbon black (hard carbon) may be, for example, about 10 nm to 35 nm, preferably about 15 nm to 33 nm, and more preferably about 20 nm to 32 nm (particularly 25 nm to 30 nm). When the average primary particle diameter is too small, the hard carbon may be difficult to prepare, and when the average primary particle diameter is too large, the effect of improving power transmission under high load may be reduced.

The carbon black may contain soft carbon having a primary particle diameter of 40 nm or more in order to prevent heat generation when the belt is bent and to reduce torque loss. The average primary particle diameter of the soft carbon may be, for example, 300 nm or less, preferably 200 nm or less, and more preferably 100 nm or less. The average primary particle diameter of the soft carbon may be, for example, about 45 nm to 200 nm, preferably about 50 nm to 150 nm, and more preferably about 55 nm to 100 nm (particularly 60 nm to 100 nm). When the average primary particle diameter of the soft carbon is too small, the effect of reducing the torque loss may be reduced, and when the average primary particle diameter is too large, the reinforcing property may be lowered and power transmission under high load may be difficult.

The iodine adsorption amount of the carbon black may be, for example, about 5 mg/g to 200 mg/g (for example, 10 mg/g to 150 mg/g), and preferably about 12 mg/g to 130 mg/g (for example, 20 mg/g to 100 mg/g).

The iodine adsorption amount of the hard carbon may be 60 mg/g or more, for example, about 60 mg/g to 150 mg/g, preferably about 65 mg/g to 130 mg/g, and more preferably about 70 mg/g to 100 mg/g (particularly 75 mg/g to 90 mg/g). When the iodine adsorption amount is too small, the effect of improving the power transmission under high load may be reduced, and when the iodine adsorption amount is too large, the hard carbon may be difficult to prepare.

The iodine adsorption amount of the soft carbon may be less than 60 mg/g, for example, about 10 mg/g or more and less than 60 mg/g, preferably about 15 mg/g to 50 mg/g, and more preferably about 18 mg/g to 40 mg/g (particularly 20 mg/g to 30 mg/g). When the iodine adsorption amount is too small, the reinforcing property of the carbon black may be lowered and power transmission under high load may be difficult, and on the contrary, when the iodine adsorption amount is too large, the effect of reducing the torque loss may be reduced.

The mass ratio of the hard carbon to the soft carbon can be selected from the range of, for example, the former/the latter=100/0 to 10/90 (for example, 70/30 to 20/80), and may be about 90/10 to 30/70, and preferably about 80/20 to 40/60.

The silica includes dry silica, wet silica, and surface-treated silica. Further, the silica can be classified into, for example, dry method white carbon, wet method white carbon, colloidal silica, precipitated silica and the like depending on the production method. These silicas can be used alone or in combination of two or more thereof. Among these silicas, silica having a surface silanol group (silicic acid anhydride, hydrous silicic acid) is preferred, and hydrous silicic acid having a large amount of surface silanol groups has a strong chemical bonding force with the rubber component.

The average particle diameter (average primary particle diameter) of the silica may be, for example, about 1 nm to 500 nm (for example, 3 nm to 300 nm), and preferably about 5 nm to 100 nm (for example, 10 nm to 50 nm). When the particle diameter of the silica is too large, the reinforcing property of the belt body may decrease, and when the particle diameter is too small, it may be difficult to disperse uniformly.

The nitrogen adsorption specific surface area of the silica according to the BET method may be, for example, about 50 $m^2/g$ to 400 $m^2/g$ (for example, 70 $m^2/g$ to 300 $m^2/g$), and preferably about 100 $m^2/g$ to 250 $m^2/g$ (for example, 150 $m^2/g$ to 200 $m^2/g$). When the specific surface area is too large, torque loss is likely to occur and it may be difficult to disperse uniformly, and when the specific surface area is too small, the reinforcing property for rubber may decrease.

As these reinforcing agents, commercially available fillers can be used as reinforcing agents for rubber.

The proportion of the reinforcing agent (reinforcing filler) may be about 30 parts by mass or more (for example, about 30 to 170 parts by mass), preferably about 35 to 150 parts by mass (for example, about 40 to 120 parts by mass), and more preferably about 45 to 100 parts by mass (for example, about 50 to 100 parts by mass) with respect to 100 parts by mass of the rubber component forming the inner layer (particularly, ethylene-α-olefin elastomer). When the proportion of the reinforcing agent is too small, the reinforcing property of the rubber may decrease, and conversely, when the proportion is too large, the torque loss may increase.

More specifically, the proportion of the carbon black may be 20 parts by mass or more (for example, 20 to 150 parts by mass) with respect to 100 parts by mass of the rubber component forming the inner layer (particularly, ethylene-α-olefin elastomer), and may be, for example, about 25 to 100 parts by mass, preferably about 30 to 80 parts by mass (for example, 35 to 75 parts by mass), and more preferably about 40 to 70 parts by mass (particularly, about 50 to 60 parts by mass). When the proportion of the carbon black is too small, the mechanical strength of the belt may decrease, and when the carbon black is too large, it may be difficult to disperse uniformly.

The proportion of silica may be about 0 to 50 parts by mass (for example, about 1 to parts by mass), preferably about 3 to 25 parts by mass, and more preferably about 5 to 15 parts by mass (for example, about 5 to 10 parts by mass) with respect to 100 parts by mass of the rubber component forming the inner layer (particularly, ethylene-α-olefin elastomer).

In the present application, the average primary particle diameter of the reinforcing filler (carbon black and silica) can be calculated as an arithmetic average particle size of an appropriate number of samples (for example, 50 samples) by, for example, image analysis of an electron micrograph including a transmission electron microscope and a scanning electron microscope. In addition, the iodine adsorption amount of the carbon black can be measured according to the standard test method of ASTM D1510-19a. There is a close relationship between the iodine adsorption amount and the primary particle diameter, and the smaller the primary particle diameter, the larger the iodine adsorption amount tends to be.

(Short Fibers)

The rubber composition forming the inner layer may further include short fibers. Examples of the short fibers include short fibers of fibers (water-absorbent fibers and/or non-water-absorbent fibers) exemplified by the above-described fabric (knitted fabric, etc.) [for example, cellulose-based short fibers such as cotton and rayon, polyester-based short fibers (PET short fibers, etc.), and polyamide short fibers (aliphatic polyamide short fibers such as polyamide 6, aramid short fibers, etc.)]. These short fibers may be used alone or in combination of two or more thereof. The average fiber length of the short fibers may be, for example, about 0.1 mm to 30 mm (for example, 0.2 mm to 20 mm), preferably about 0.3 mm to 15 mm, and more preferably about 0.5 mm to 5 mm.

The short fibers may be subjected to a surface treatment with a surfactant, a silane coupling agent, an epoxy compound (or epoxy resin), an isocyanate compound (polyisocyanate), a resorcin-fonnalin-latex liquid (RFL liquid), or the like, if necessary.

The short fibers can be oriented in a predetermined direction in the process of preparing an unvulcanized rubber sheet by, with a roll or a calender, rolling a rubber composition kneaded with a Banbury mixer or the like.

When the short fibers are contained in the inner layer, the bendability is lowered and the torque loss is likely to increase. Therefore, the content of the short fibers is preferably low. The proportion of the short fibers may be a small amount, for example, 10 parts by mass or less (for example, about 0.1 to 10 parts by mass) with respect to 100 parts by mass of the rubber component forming the inner layer. The inner layer does not have to contain short fibers. In a frictional power transmission belt (V-ribbed belt, etc.) having a frictional power transmission surface not covered with a fabric, when the content of the short fibers is small, the durability and the sound emission resistance of the belt may decrease. However, in the present invention, since the frictional power transmission surface is covered with a fabric (knitted fabric, etc.), the durability and the sound emission resistance are excellent even when the content of the short fibers is small or short fibers are not contained.

(Vulcanizer and Crosslinking Agent)

The rubber composition forming the inner layer usually further contains a vulcanizer and/or a crosslinking agent. Examples of the vulcanizer include sulfur, oximes (quinone dioximes, etc.), and guanidines (diphenylguanidine, etc.). Examples of the crosslinking agent include an organic peroxide. Examples of the organic peroxide include commonly used components, for example, diacyl peroxides (dilauroyl peroxide, dibenzoyl peroxide, etc.), peroxy ketals (1,1-di(t-butylperoxy) cyclohexane, 2,2-di(t-butylperoxy) butane, etc.), alkyl peroxy esters (t-butyl peroxybenzoate, etc.), dialkyl peroxides (di-t-butyl peroxide, dicumyl peroxide, t-butyl cumyl peroxide, 2,5-dimethyl-2,5-di(t-butylperoxy)hexane, 2,5-dimethyl-2,5-di(t-butylperoxy)hexyne-3,1, 1-di(t-butylperoxy)-3,3,5-trimethylcyclohexane, 1,3-bis(2-t-butylperoxyisopropyl) benzene, 2,5-di-methyl-2,5-di (benzoyl peroxide) hexane, etc.), and peroxycarbonates (t-butylperoxyisopropyl carbonate, t-butylperoxy-2-ethylhexyl carbonate, t-amylperoxy-2-ethyl-hexyl carbonate, etc.). These vulcanizers or crosslinking agents can be used alone or in combination of two or more thereof.

From the viewpoint of being capable of improving the durability, the total proportion of the vulcanizer and the crosslinking agent can be selected from, for example, the range of about 0.2 to 10 parts by mass (for example, 0.5 to 7 parts by mass) with respect to 100 parts by mass of the rubber component (particularly, ethylene-α-olefin elastomer) forming the inner layer, and generally may be about 1 to 5 parts by mass (for example, 1.5 to 4 parts by mass), and preferably about 1.5 to 3 parts by mass (particularly, 1.5 to 2.5 parts by mass). When the proportion of the vulcanizer and the crosslinking agent is too large, the rubber hardness may increase excessively and the durability may decrease, and when the proportion is too small, crosslinking may not proceed sufficiently, and the strength and modulus of the rubber may be insufficient, making power transmission under high load difficult.

(Other Components)

The rubber composition forming the inner layer may further include additives used commonly, if necessary.

Examples of the additives used commonly include: co-crosslinking agents (alkane polyol poly(meth)acrylates such as ethylene glycol dimethacrylate, butanediol dimethacrylate, trimethylolpropane trimethacrylate, and pentaerythritol tetramethacrylate), triallyl (iso)cyanurates, and bismaleimides such as N,N'-m-phenylene bismaleimide and N,N'-(4,4'-diphenylmethane bismaleimide); vulcanization aids; vulcanization accelerators (thiuram-based accelerators, etc.); vulcanization promoters (stearic acid, etc.); vulcanization retarders; metal oxides (zinc oxide, magnesium oxide, calcium oxide, barium oxide, iron oxide, copper oxide, titanium oxide, aluminum oxide, etc.); fillers (clay, calcium carbonate, talc, mica, etc.); non-hydrophilic plasticizer or softener (oils such as paraffin oil and naphthenic oil); processing agents or processing aids (metal stearate, wax, paraffin, etc.); anti-aging agents (aromatic amine-based anti-aging agents, benzimidazole-based anti-aging agents, etc.); adhesiveness improvers [resolcin-formaldehyde cocondensates, melamine resins such as hexamethoxymethylmelamine, cocondensates of these (resorcin-melamine-formaldehyde cocondensates, etc.), etc.]; colorants; tackifiers; coupling agents (silane coupling agents, etc.); stabilizers (antioxidants, UV absorbers, heat stabilizers, etc.); lubricants; flame retardants; and antistatic agents. These additives may be used alone or in combination.

The additives can be selected according to the type of additive, and the total proportion of the additives may be, for example, about 0.1 to 30 parts by mass (for example, 0.5 to 20 parts by mass), and preferably about 1 to 15 parts by mass (particularly, 1.5 to 10 parts by mass) with respect to 100 parts by mass of the rubber component (particularly, ethylene-α-olefin elastomer, etc.) forming the inner layer.

The rubber composition forming the inner layer is characterized by containing a combination of a hydrophilic plasticizer, an unsaturated carboxylic acid metal salt, and polyolefin particles, and may further contain a non-hydrophilic plasticizer. However, when a non-hydrophilic plasticizer is contained, the amount of the non-hydrophilic plasticizer is preferably small. The proportion of the non-hydrophilic plasticizer may be 10 parts by mass or less, preferably 8 parts by mass or less (for example, 1 to 8 parts by mass), and more preferably 2 to 6 parts by mass with respect to 100 parts by mass of the rubber component forming the inner layer (particularly, ethylene-α-olefin elastomer, etc.). When the proportion of the non-hydrophilic plasticizer is too large, the sound emission resistance during water injection and the wear resistance may decrease.

(Properties of Inner Layer)

The inner layer may be formed of a rubber composition in which the Mooney scorch minimum viscosity Vm (Vm of the unvulcanized rubber composition measured at a temperature of 125° C.) is adjusted to a predetermined range. Specifically, Vm of the rubber composition forming the inner layer can be selected from the range of 50 to 130 (for example, 55 to 120), and may be, for example, 57 to 115 (for example, 60 to 110), preferably 65 to 100, and more preferably about 70 to 90. When the inner layer is formed of such a rubber composition, the rubber can be prevented from bleeding out to the frictional power transmission surface penetrating the structure of the fabric, and the sound emission resistance can be improved. When the Vm of the rubber composition is too high, the fluidity of the rubber composition may decrease, the penetration to the fabric may decrease, the wear resistance may decrease, and the moldability of the inner layer may decrease. When the Vm is too low, the fluidity of the rubber composition is too high, so that the rubber composition permeates the structure of the fabric (knitted fabric, etc.) and easily bleeds to the frictional power transmission surface, and the bleeding-out to the frictional power transmission surface cannot be sufficiently prevented, which may reduce the sound emission resistance.

When the Vm of the rubber composition forming the inner layer is too high, the adhesiveness to the fabric forming the frictional power transmission surface may decrease. However, even when a high Vm rubber composition is used, high adhesiveness between the inner layer and the fabric can be ensured by a method of preliminarily pressurizing in the vulcanization step and then heating to perform vulcanization molding, a method of raising the vulcanization molding temperature, or a method of treating the fabric.

The thickness (average thickness) of the inner layer can be selected from the range of about 0.03 mm to 0.5 mm, and may be, for example, about 0.05 mm to 0.3 mm, preferably about 0.1 mm to 0.25 mm, and more preferably about 0.12 mm to 0.2 mm (particularly 0.13 mm to 0.18 mm). The thickness (average thickness) of the inner layer can be selected from the range of about 1% to 50% with respect to the average thickness (average thickness to the top of the rib portion) of the entire compression rubber layer, and may be for example, about 2% to 40%, preferably about 3% to 30% (for example, 4% to 20%), and more preferably about 5% to 15% (particularly 6% to 10%). When the thickness of the inner layer is too small, the sound emission resistance during water injection and wear resistance may not be improved so much. On the contrary, when the thickness of the inner layer is too large, crack resistance may be lowered.

[Outer Layer of Compression Rubber Layer]

In addition to the inner layer, the compression rubber layer has an outer layer (outer rubber layer) on the outer peripheral side of the inner layer. The outer layer may be formed of a plurality of layers, but is preferably a single layer (one layer) from the viewpoint of productivity and the like.

The rubber component of the unvulcanized rubber composition forming the outer layer is similar to the rubber component of the inner layer, including preferred examples and proportions.

The rubber composition forming the outer layer preferably contains a plasticizer from the viewpoint of moldability and the like, and is preferably adjusted to a specific proportion from the viewpoint of improving the adhesiveness to a cord (particularly, a cord formed of aramid fibers). Examples of the plasticizer include the hydrophilic plasticizer and the non-hydrophilic plasticizer exemplified in the section of the inner layer. These plasticizers can be used alone or in combination of two or more thereof. Among the plasticizers, non-hydrophilic plasticizers such as paraffin oil are preferable from the viewpoint that moldability can be improved with a small amount of the plasticizers.

In the rubber composition forming the outer layer, the proportion of the plasticizer may be, for example, about 0.1 to 10 parts by mass, preferably about 0.5 to 8 parts by mass, and more preferably about 1 to 5 parts by mass (particularly about 2 to 4 parts by mass) with respect to 100 parts by mass of the rubber component (particularly, ethylene-α-olefin elastomer). When the proportion of the plasticizer is too small, the moldability may decrease, and when the proportion is too large, the adhesiveness to the cord may decrease.

Unlike the inner layer, the proportion of the polyolefin particles of the rubber composition forming the outer layer is preferably small from the viewpoint of improving the adhesiveness to the cord (particularly, the cord formed of the aramid fibers). The proportion of the polyolefin particles may be less than 1 part by mass, preferably 0.5 part by mass or less, more preferably 0.1 part by mass or less, and still more preferably 0.01 part by mass or less, with respect to 100 parts by mass of the rubber component forming the outer layer (particularly, ethylene-α-olefin elastomer). Among these, it is preferable that the polyolefin particles are not substantially contained, and it is particularly preferable that the polyolefin particles are not contained.

The rubber composition forming the outer layer may further contain an unsaturated carboxylic acid metal salt, but from the viewpoint of durability, unlike the inner layer, it is preferable that the proportion of the unsaturated carboxylic acid metal salt is also small. The proportion of the unsaturated carboxylic acid metal salt may be less than 0.5 parts by mass, preferably 0.3 parts by mass or less, more preferably 0.1 parts by mass or less, and still more preferably 0.01 parts by mass or less with respect to 100 parts by mass of the rubber component forming the outer layer (particularly, ethylene-α-olefin elastomer). Among these, it is preferable that the unsaturated carboxylic acid metal salt is not substantially contained, and it is particularly preferable that the unsaturated carboxylic acid metal salt is not contained.

The rubber composition forming the outer layer may further contain a reinforcing agent (reinforcing filler). The reinforcing agent is similar to the reinforcing agent for the inner layer, including preferred examples. The proportion of the carbon black may be higher than that of the inner layer from the viewpoint of improving durability. The proportion of the carbon black may be 30 parts by mass or more (for example, 30 to 200 parts by mass) with respect to 100 parts by mass of the rubber component forming the outer layer (particularly, ethylene-α-olefin elastomer), and may be, for example, about 40 to 200 parts by mass, preferably about 50 to 150 parts by mass, and more preferably about 60 to 100 parts by mass (particularly, about 70 to 90 parts by mass).

The rubber composition forming the outer layer may further contain short fibers, a vulcanizer, a crosslinking agent, and other components. The components are similar to the short fibers, the vulcanizer, the crosslinking agent, and other components of the inner layer, including preferred examples and proportions.

The Mooney scorch minimum viscosity Vm of the rubber composition forming the outer layer is not particularly limited, but is preferably different from Vm of the rubber composition forming the inner layer from the viewpoint of improving the durability of the belt, and may be equal to or lower than Vm of the rubber composition forming the inner layer, but is preferably higher than Vm of the rubber composition forming the inner layer. The Vm of the rubber composition forming the outer layer may be, for example, about 50 to 150, preferably about 70 to 130, more preferably about 80 to 120, and more preferably about 90 to 110. The difference between these Vms is such that the Vm of the rubber composition forming the inner layer may be, for example, 5 to 40, preferably 10 to 30, and more preferably 15 to 25 lower than the Vm of the rubber composition forming the outer layer. Thus, when an unvulcanized compression rubber layer (unvulcanized rubber sheet) in which Vm is distributed in the thickness direction is used, the Vm of the outer layer can be increased to increase the strength of the belt, while the Vm of the inner layer can be decreased (to the extent that the rubber does not completely penetrate the fabric). Therefore, the rubber composition can easily penetrate into the structure of the fabric without lowering the durability of the belt, and the adhesive force between the fabric and the compression rubber layer and the wear resistance of the fabric can be improved. When the Vm of the rubber composition is too low, the belt strength may decrease. On the contrary, when the Vm is too high, the rib shape may be defective.

[Properties of Compression Rubber Layer]

The thickness (average thickness) of the compression rubber layer may be, for example, about 1 mm to 30 mm, preferably about 1.5 mm to 25 mm, and more preferably about 2 mm to 20 mm, depending on the type of the frictional power transmission belt. For example, the thickness of the compression rubber layer of the V-belt (the thickness at the top of the cog portion in the belt in which the cog portion is formed) may be, for example, about 5 mm to 30 mm (for example, about 7 mm to 25 mm). In addition, the thickness of the compression rubber layer of the V-ribbed belt (the thickness at the top of the rib portion) is smaller than the thickness of the compression rubber layer of the V-belt, and may be, for example, about 1 mm to 10 mm, preferably about 1.5 mm to 8 mm, and more preferably about 2 mm to 6 mm (particularly, about 2.5 mm to 6 mm), or about 1.5 mm to 5 mm (for example, about 2 mm to 4 mm).

In the V-ribbed belt, the pitch of the rib portion may be selected from the range of, for example, about 1 mm to 10 mm (for example, 1.2 mm to 8 mm), or may be about 1.5 mm to 5 mm (for example, 1.6 mm to 4 mm).

[Cord (or Tension Member)]

Examples of fibers forming the cord (or tension member) include fibers having a high elastic modulus, for example, high strength polyethylene fiber, PBO fibers, polyarylate fibers, polyester fibers such as PET fibers and PEN fibers, polyamide fibers such as aramid fibers, and carbon fibers. These fibers can be used alone or in combination of two or more thereof.

JP-A-2014-209028, etc. discloses that in order to use fibers having a high elastic modulus, it is necessary to set the expansion rate of the flexible jacket in the molding step to be low, so that the cord of polyester fibers having a low elastic modulus such as PET fibers is used. Although the frictional power transmission belt can be used for a wide range of purposes even with such a cord, in recent years, it is required to increase the power transmission capacity due to space saving and an increase in auxiliary machine in the automobile industry and the like. Therefore, it is important to use a cord made of fibers having a high tensile elastic modulus. However, when such a cord is used, even when the expansion force of the flexible jacket is utilized in the molding and vulcanization steps, a laminate containing the unvulcanized rubber layer cannot be sufficiently pressed against the outer mold having the rib mold, and the accuracy of the rib portion of the belt is lowered. On the other hand, when the pressure of the laminate (laminate containing the unvulcanized rubber layer) with respect to the molding mold (for example, the expansion pressure for pressing the molded body toward the outer mold) is increased, the rubber composition easily penetrates the structure of the fabric and bleeds out to the frictional power transmission surface. Therefore, even when the laminate is pressurized against the outer mold at a high pressure, it is necessary to take measures to prevent the rubber composition from bleeding out to the frictional power transmission surface.

In the present invention, even when the laminate is pressurized with a high pressure in the molding step, and even when the belt has a cord formed of fibers having a high tensile elastic modulus embedded therein, it is possible to effectively prevent the rubber composition from bleeding out to the frictional power transmission surface by using the specific compression rubber layer. Therefore, the present invention can be suitably applied not only to a frictional power transmission belt containing a cord formed of fibers having a low tensile elastic modulus, but also to a frictional power transmission belt containing a cord formed of fibers having a high tensile elastic modulus.

The tensile elastic modulus of the fibers forming the cord may be, for example, about 1 GPa to 500 GPa (for example, 5 GPa to 400 GPa), and preferably about 10 GPa to 300 GPa (for example, 25 GPa to 250 GPa). In the present invention, the tensile elastic modulus may be about 50 GPa or more (for example, 60 GPa to 500 GPa, preferably 70 GPa to 400 GPa, and more preferably 100 GPa to 300 GPa.), and the cord can be effectively applied to a frictional power transmission belt containing a cord formed of fibers having a high elastic modulus of about 60 GPa to 150 GPa (for example, 65 GPa to 120 GPa). Such fibers having a high elastic modulus include, for example, aramid fibers and carbon fibers.

The average fineness of the fibers (monofilament yarns) may be, for example, about 0.1 dtex to 5 dtex, preferably about 0.3 dtex to 3 dtex, and more preferably about 0.5 dtex to 1 dtex. The fibers can be used in the form of a multifilament yarn as a raw yarn (for example, a multifilament yarn containing about 1,000 to 50,000, and preferably about 5,000 to 20,000 monofilament yarns).

The cord (or tension member) can be generally used in the form of a twisted cord using multifilament yarns (e.g., plied twist, single twist, and Lang twist) in order to enhance the tensile strength and the bending fatigue resistance. The cord is often used, for example, as a twisted cord (twisted yarn) in which these multifilament yarns are used as primary twisted yarns and twisted secondarily in a predetermined direction (for example, in the direction same as or opposite to the primary twisted yarn). The average diameter (average wire diameter) of the primary twisted yarns may be, for example, about 0.2 mm to 1 mm, preferably 0.3 mm to 0.8 mm, and more preferably 0.4 mm to 0.7 mm. The average diameter (average wire diameter) of the cord may be, for example, about 0.3 mm to 1.5 mm, preferably about 0.5 mm to 1.3 mm, and more preferably about 0.7 mm to 1.2 mm.

Twisting coefficients of primary twisted yarns and final twisted yarns can be selected from the range of about 0.1 to 10. In the present application, each twisting coefficient of the primary twisting coefficient and the final twisting coefficient can be calculated based on the following equation.

Twisting coefficient=[the number of twists (turns/m)×√total fineness (tex)]/960

In order to improve the adhesiveness with the rubber component, the cord is subjected to an adhesion treatment with an epoxy compound, an isocyanate compound, an RFL treatment liquid, a silane coupling agent or the like, similar to the fabric on the frictional power transmission surface and the short fibers.

The cord may be generally embedded in the longitudinal direction of the belt body, and a plurality of cords parallel to the longitudinal direction may be arranged. From the viewpoint of productivity, generally, the cords are arranged in a spiral shape so as to extend substantially in parallel at a predetermined pitch in the longitudinal direction of the belt. When the cords are arranged in a spiral shape, an angle of the cord with respect to the longitudinal direction of the belt may be, for example, 5° or less, and from the viewpoint of belt running properties, it is preferable that the angle is closer to 0°. The cord pitch may be larger than the cord diameter according to the cord diameter, and may be, for example, about 0.5 mm to 2 mm, preferably about 0.7 mm to 1.7 mm, and more preferably about 0.8 mm to 1.5 mm.

[Tension Layer]

The tension layer may be formed of a rubber composition same as that of the compression rubber layer, or may be formed of a fabric (reinforcing fabric) such as a canvas. Examples of the fabric (reinforcing fabric) include fabric materials such as a woven fabric, a wide-angle fabric, a knitted fabric, and a non-woven fabric. Among these, woven fabrics woven in the form of plain weave, twill weave, satin weave, or the like, wide-angle fabrics or knitted fabrics in which an intersection angle between warp yarns and weft yarns is about 90° to 120°, or the like are preferred. As fibers constituting the reinforcing fabric, the fibers (water-absorbent fibers, non-water-absorbent fibers, and the like) exemplified in the section of the fabric (knitted fabric, etc.) of the compression rubber layer can be used.

As the rubber (rubber composition) forming the tension layer, a rubber composition similar to the rubber composition forming the compression rubber layer (particularly, the outer layer containing no hydrophilic plasticizer) may be used. In such a rubber composition, the content of the reinforcing agent or the reinforcing filler (carbon black etc.) may be about to 150 parts by mass (for example, 40 to 120 parts by mass), preferably about 50 to 100 parts by mass, and more preferably about 70 to 90 parts by mass with respect to 100 parts by mass of the rubber component. The tension rubber layer may contain the short fibers in order to prevent abnormal noise generated by the adhesion of the back rubber in a back drive. The proportion of the short fibers may be, for example, about 5 to 30 parts by mass (preferably 10 to 25 parts by mass, and more preferably 15 to 25 parts by mass) with respect to 100 parts by mass of the rubber component. The short fibers may be randomly arranged in the rubber composition.

In addition, the fabric (reinforcing fabric) forming the tension layer may be subjected to an adhesion treatment similar to that of the fabric on the frictional power transmission surface or the short fibers. Further, instead of the adhesion treatment commonly used, or after the adhesion treatment, a friction treatment in which a reinforcing fabric and a rubber composition are passed through a calender roll to imprint the rubber composition on the reinforcing fabric, a spreading treatment in which a rubber paste is coated onto a reinforcing fabric, a coating treatment in which a rubber composition is laminated on a reinforcing fabric, or the like may be performed.

Further, in order to prevent abnormal noise in a back drive, an uneven pattern (knitted fabric pattern, woven fabric pattern, sudare woven fabric pattern, embossed pattern, etc.) may be provided on the surface of the tension layer (the back surface of the belt).

The thickness (average thickness) of the tension layer may be, for example, about 0.5 mm to 10 mm, preferably about 0.7 mm to 8 mm, and more preferably about 1 mm to 5 mm.

[Adhesion Rubber Layer]

It is not always necessary to interpose an adhesion rubber layer between the compression rubber layer and the tension layer. In a preferred example of the present invention, a frictional power transmission belt can be produced without interposing an adhesion rubber layer, and therefore productivity is high. The adhesion rubber layer may be formed of, for example, a rubber composition similar to that of the compression rubber layer (for example, a rubber composition containing an ethylene-α-olefin elastomer). The rubber composition forming the adhesion rubber layer may further contain an adhesiveness improver (a resorcin-formaldehyde cocondensate, an amino resin, or the like).

The thickness (average thickness) of the adhesion rubber layer may be, for example, about 0.2 mm to 5 mm, preferably about 0.3 mm to 3 mm, and more preferably about 0.5 mm to 2 mm.

In the rubber compositions forming the tension rubber layer and the adhesion rubber layer, the rubber of the same system or the same type as the rubber component of the rubber composition of the compression rubber layer is often used as the rubber component. The proportion of additives such as a vulcanizer, a crosslinking agent, a co-crosslinking agent, a crosslinking aid, and a vulcanization accelerator may be selected from the same range as that of the rubber composition of the compression rubber layer.

[Method for Producing Frictional Power Transmission Belt]

The frictional power transmission belt (V-ribbed belt, etc.) of the present invention can be produced by a commonly used method. For example, the frictional power transmission belt can be produced by pressurizing and vulcanizing a cylindrical unvulcanized laminate containing at least a fabric (knitted fabric, etc.) and an unvulcanized compression rubber layer formed of a plurality of rubber compositions so that the fabric is toward a molding mold, to form a sleeve (cylindrical vulcanized molded body), and cutting the unvulcanized sleeve to a predetermined width. In a preferred example, a cylindrical unvulcanized laminate in which a tension layer (or an unvulcanized tension rubber layer), a cord (tension member), an unvulcanized compression rubber layer formed of a plurality of rubber compositions, and a fabric (knitted fabric, etc.) are sequentially laminated in a cylindrical shape is used. In addition, as described above, the cylindrical unvulcanized laminate may be a laminate in which an unvulcanized adhesion rubber layer is interposed between the unvulcanized compression rubber layer and the tension layer (or an unvulcanized tension rubber layer), if necessary. In such a laminate, the cord (tension member) may be embedded in a predetermined portion, for example, in the unvulcanized adhesion rubber layer. More specifically, the V-ribbed belt can be produced, for example, by the following method.

(First Production Method)

The frictional power transmission belt (V-ribbed belt, etc.) can be produced by using a forming device including a hollow cylindrical outer mold, a cylindrical inner mold that can be disposed concentrically with this outer mold, and a pressing unit that can move or press the cylindrical unvulcanized laminate disposed between the outer mold and the inner mold toward the outer mold. That is, the V-ribbed belt can be produced by: laminating and disposing a cylindrical unvulcanized laminate on a cylindrical inner mold concentrically disposed in a hollow cylindrical outer mold so that the fabric is directed toward the outer mold; pressurizing and vulcanizing the cylindrical unvulcanized laminate toward the outer mold; and demolding the vulcanized cylindrical molded body and processing the cylindrical molded body into a predetermined form. The cylindrical unvulcanized laminate may be a hollow cylindrical or sleeve-shaped laminate including: an unvulcanized rubber laminated sheet for forming a belt body, which includes at least a plurality of unvulcanized rubber sheets for compression rubber layer and an unvulcanized rubber sheet for tension rubber layer laminated or disposed on one surface of the unvulcanized rubber sheet for compression rubber layer; a cord embedded in the longitudinal direction of the unvulcanized rubber laminated sheet; and a knitted fabric laminated or disposed on the other surface of the unvulcanized rubber sheet for compression rubber layer. Such a laminate may be disposed so that the knitted fabric is directed toward the rib mold of the outer mold, and the unvulcanized rubber sheet may be pressurized and vulcanized.

More specifically, a flexible jacket that is expandable and contractable is mounted to the outer peripheral surface of the cylindrical inner mold, an unvulcanized sheet for tension layer is wound around the flexible jacket, a cord (twisted cord) is spirally spun on the sheet, and an unvulcanized sheet for compression rubber layer and a fabric (knitted fabric, etc.) are wound around the sheet, so as to prepare a cylindrical laminate. A hollow cylindrical outer mold with a plurality of rib molds engraved on an inner peripheral surface thereof is used as an outer mold which can be mounted to the inner mold, and the inner mold around which the above-described laminate is wound is disposed concentrically inside the outer mold. Then, the flexible jacket is expanded toward the inner peripheral surface (rib molds) of the outer mold, and the laminate (compression rubber layer) is pressed into the rib molds and vulcanized. Then, the inner mold is removed from the outer mold, and a vulcanized molded body sleeve including a plurality of rib portions is demolded from the outer mold, whereby a sleeve-shaped frictional power transmission belt (V-ribbed belt) can be produced. If necessary, a frictional power transmission belt (V-ribbed belt) may be produced by cutting a sleeve-shaped frictional power transmission belt (V-ribbed belt) with a predetermined width in the longitudinal direction of the belt using a cutter.

(Second Production Method)

In relation to the first production method, for example, a method disclosed in JP-A-2004-82702 may be used in which only a fabric and a compression rubber layer are expanded to prepare a preliminary molded body (semi-vulcanized state), and next a tension layer and a cord are expanded to be pressed and attached onto the preliminary molded body so as to be vulcanized and integrated, thereby obtaining a frictional power transmission belt (V-ribbed belt).

In such methods (particularly the first production method), the pressure of the unvulcanized rubber sheet (or the cylindrical unvulcanized laminate) with respect to the outer mold is not particularly limited. When a cord of fibers having a high tensile elastic modulus is used, the unvulcanized rubber sheet may be pressurized at a pressure (for example, the expansion pressure of the flexible jacket) of 1.2 MPa or more (for example, about 1.3 MPa to 2 MPa, and preferably about 1.3 MPa to 1.7 MPa.). By pressurization with such a pressure, the shape of the rib portion can be accurately formed even when the cord of fibers having a high tensile elastic modulus is used. Further, when a rubber composition having a predetermined Mooney Scorch minimum viscosity Vm at least on the inner peripheral surface side of the belt is used, it is possible to prevent the bleeding-out of the rubber composition to the frictional power transmission surface, and the sound emission resistance does not decrease even when a pressure is applied at a high pressure by utilizing the expansion force of the flexible jacket.

In the unvulcanized rubber sheet for compression rubber layer formed of a plurality of unvulcanized rubber layers, the unvulcanized rubber layer forming the inner rubber layer may be thin. For such an unvulcanized rubber sheet containing an unvulcanized rubber layer, for example, an unvulcanized rubber sheet may be rolled with a calender roll to form at least the unvulcanized rubber layer forming the inner rubber layer (the unvulcanized rubber layer or rubber sheet for inner rubber layer), and an unvulcanized rubber sheet for outer rubber layer is laminated with the unvulcanized rubber layer for inner rubber layer on a calender roll, so as to prepare an unvulcanized rubber sheet for compression rubber layer. Since the unvulcanized rubber layer forming the inner rubber layer alone is thin, the handleability thereof is poor and wrinkles and the like are likely to occur on the sheet. However, when such a method is used, a thin unvulcanized rubber sheet rolled on the calender roll can be laminated and integrated with the unvulcanized rubber sheet forming the outer peripheral surface on the calender roll, so that the unvulcanized rubber layer forming the inner rubber layer can be uniformly laminated, and the handleability and the productivity can be greatly improved.

EXAMPLES

Hereinafter, the present invention is described in more detail based on Examples, but the present invention is not limited to these Examples. Hereinafter, materials to be used, methods for preparing the unvulcanized rubber sheet and the belt, and methods for measuring or evaluating the respective physical properties are described.
[Material in Use]
(Rubber Composition)
  EPDM: "EPT3070" manufactured by Mitsui Chemicals, Inc., Mooney viscosity (125° C.): about 47
  Zinc oxide: "zinc oxide second grade" manufactured by SAKAI CHEMICAL INDUSTRY CO., LTD.
  Stearic acid: "Beads Stearic acid Tsubaki" manufactured by NOF Corporation
  Carbon black HAF: "SEAST 3" manufactured by Tokai Carbon Co., Ltd., average primary particle diameter: 28 nm, iodine adsorption amount: 80 mg/g
  Hydrophilic plasticizer: "EMULGEN LS-106" manufactured by Kao Corporation, polyoxyalkylene alkyl ether, HLB=12.5, melting point: −10° C.
  Plasticizer (non-hydrophilic): "Diana Process Oil PW-90" manufactured by Idemitsu Kosan Co., Ltd., paraffin-based process oil
  Unsaturated carboxylic acid metal salt: "San Ester SK-30" manufactured by Sanshin Chemical Industry Co., Ltd., zinc methacrylate
  Polyolefin particles: "GUR4150" manufactured by Ticona, ultra high molecular weight polyethylene having a viscosity average molecular weight of 9,200,000, average particle size of 120 μm
  Anti-aging agent: "Nonflex OD-3" manufactured by Seiko Chemical Co., Ltd., octyldiphenylamine
  Organic peroxide: "Percumyl D" manufactured by NOF Corporation, dicumyl peroxide
  Short fiber: nylon flocs, average fiber length: about 0.5 mm.

(Cord)

Two bundles of 1,100 dtex aramid fibers (tensile elastic modulus: 70 GPa) were pulled together and subjected to primary twist at a twisting coefficient of 3.0 to prepare primary twisted yarns. Next, three primary twisted yarns were pulled together and secondarily twisted with a twisting coefficient of 3.0 in the direction opposite to the primary twist to prepare plied twisted cords having a total fineness of 6,600 dtex. The plied twisted cords were immersed in the following RFL treatment liquid and dried to prepare treated cords.

(Knitted Fabric (Fabric))

A knitted fabric with a weft knitting structure (moss stitch, 2 layers) was produced by knitting a cotton spun yarn (count: 40, 1 yarn) as a water-absorbent fiber and a PTT/PET conjugate yarn as a non-water-absorbent fiber (fineness: 84 dtex). A treated knitted fabric was produced by immersing the knitted fabric in the following RFL treatment liquid and then performing drying.

(RFL Treatment Liquid)

Solution containing 2.6 parts by mass of resorcin, 1.4 parts by mass of 37% by mass of formalin, 17.2 parts by mass of vinyl pyridine-styrene-butadiene copolymer latex, and 78.8 parts by mass of water

[Sheet for Tension Layer and Compression Rubber Layer]

A rubber composition R1 having the composition shown in Table 1 was kneaded with a Banbury mixer, and the kneaded rubber was passed through a calender roll to prepare an unvulcanized rolled rubber sheet having a predetermined thickness, so as to prepare a sheet for tension layer. In addition, rubber compositions R2 to R14 shown in Table 1 were kneaded with the Banbury mixer, and these kneaded rubbers were passed through the calendar roll to prepare a sheet for compression rubber layer as an unvulcanized rolled rubber sheet having a predetermined thickness, and the Mooney Scorch minimum viscosity (Vm) was measured.

[Mooney Scorch Minimum Viscosity (Vm)]

Figure 3:
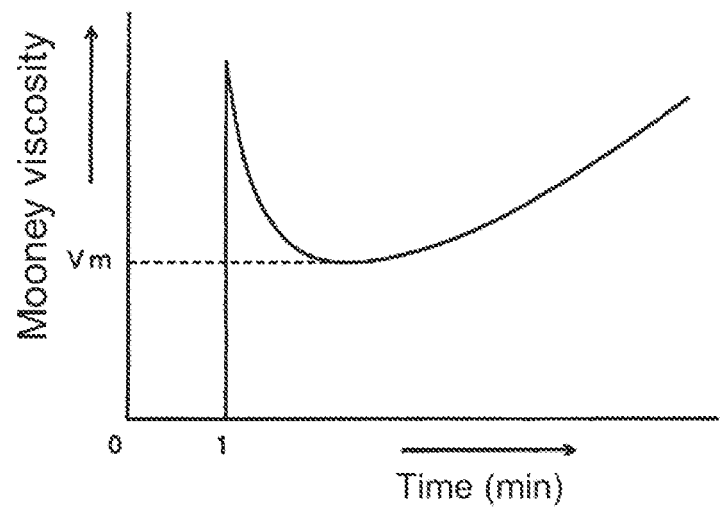
FIG. 3 is a graph showing the behavior of Mooney viscosity for illustrating a method for measuring Mooney Scorch minimum viscosity (Vm).

The Mooney Scorch minimum viscosity was measured according to the Mooney scorch test of JIS K6300-1 (2013). An L-shaped rotor was used and the test temperature was set to 125° C. A polyester film having a thickness of about 0.04 mm ("Lumirror" manufactured by Toray Industries, Inc.) was disposed between surfaces of a test piece (unvulcanized rubber composition) and a die. After closing the die, pre-heating was performed for 1 minute, thereafter the rotor was rotated and the transition of the Mooney viscosity was recorded. The recorded Mooney viscosity generally showed the behavior shown in FIG. 3, and the value when the Mooney viscosity is the lowest was adopted as the Mooney Scorch minimum viscosity (Vm).

TABLE 1

| (Composition of rubber composition: parts by mass) | | | | | | | | | | | | | | |
|---|---|---|---|---|---|---|---|---|---|---|---|---|---|---|
| | R1 | R2 | R3 | R4 | R5 | R6 | R7 | R8 | R9 | R10 | R11 | R12 | R13 | R14 |
| EPDM | 100 | 100 | 100 | 100 | 100 | 100 | 100 | 100 | 100 | 100 | 100 | 100 | 100 | 100 |
| Zinc oxide | 5 | 5 | 5 | 5 | 5 | 5 | 5 | 5 | 5 | 5 | 5 | 5 | 5 | 5 |
| Stearic acid | 1 | 1 | 1 | 1 | 1 | 1 | 1 | 1 | 1 | 1 | 1 | 1 | 1 | 1 |
| Carbon black HAF | 80 | 80 | 50 | 50 | 50 | 50 | 50 | 50 | 50 | 50 | 50 | 50 | 50 | 50 |
| Hydrophilic plasticizer | — | — | 5 | 1 | 10 | 5 | 5 | 5 | 5 | 5 | — | — | 5 | — |
| Plasticizer (non-hydrophilic) | — | 3 | — | — | — | — | — | — | — | — | — | 5 | — | 15 |
| Unsaturated carboxylic acid metal salt | — | — | 5 | 5 | 5 | 2 | 10 | 5 | 5 | 5 | 5 | — | 5 | — |
| Polyolefin particles | — | — | 10 | 10 | 10 | 10 | 10 | 5 | 30 | 50 | 10 | 10 | — | 10 |
| Anti-aging agent | 2 | 2 | 2 | 2 | 2 | 2 | 2 | 2 | 2 | 2 | 2 | 2 | 2 | 2 |
| Organic peroxide | 2 | 2 | 2 | 2 | 2 | 2 | 2 | 2 | 2 | 2 | 2 | 2 | 2 | 2 |
| Short fiber | 20 | — | — | — | — | — | — | — | — | — | — | — | — | — |
| Total | 210 | 193 | 180 | 176 | 185 | 177 | 185 | 175 | 200 | 220 | 180 | 175 | 170 | 185 |
| Vm | 120 | 100 | 80 | 85 | 75 | 75 | 85 | 75 | 90 | 95 | 80 | 75 | 75 | 65 |

[Production of Belt]

A flexible jacket was mounted to an outer peripheral surface of a cylindrical inner mold, a sheet for tension layer (unvulcanized rubber sheet for tension layer) was wound around the flexible jacket, a cord (treated cord) to be a tension member was spirally spun on the sheet for tension layer, and an sheet for compression rubber layer (unvulcanized rubber sheet for compression rubber layer) and a treated knitted fabric were wound around the sheet for tension layer, so as to prepare a laminate. When the compression rubber layer was not formed into a two-layer structure having different formulations, an unvulcanized rubber sheet having a uniform composition and a thickness of 2.0 mm was used as the sheet for compression rubber layer. On the other hand, when the compression rubber layer was formed into a two-layer structure with different formulations, as the sheet for compression rubber layer, a laminated sheet in which an unvulcanized rubber sheet for outer rubber layer and an unvulcanized rubber sheet for inner rubber layer were laminated (doubling) in advance was used. The thickness of the unvulcanized rubber sheet for outer rubber layer was 1.7 mm, the thickness of the unvulcanized rubber sheet for inner rubber layer was 0.3 mm, and the thickness of the sheet for compression rubber layer obtained by doubling the unvulcanized rubber sheet for outer rubber layer and the unvulcanized rubber sheet for inner rubber layer was 2.0 mm. The cylindrical inner mold around which the laminate was wound was disposed concentrically inside a cylindrical outer mold having a plurality of rib molds engraved on an inner peripheral surface thereof, the flexible jacket was expanded to press the laminate into the rib molds under a pressure of 1.5 MPa, and vulcanization was performed at a temperature of 160° C. for 30 minutes. Then, the inner mold was removed from the outer mold, the vulcanized rubber sleeve including a plurality of ribs was demolded from the outer mold, and the vulcanized rubber sleeve was cut into a predetermined width in the belt longitudinal direction using a cutter, thereby producing a 6PK980 V-ribbed belt (the number of ribs: 6, circumferential length: 980 mm, belt shape: K shape, belt thickness: 4.3 mm, rib height: about 2 mm, rib pitch: 3.56 mm). In the V-ribbed belt using different formulations for the outer rubber layer and the inner rubber layer, the average thickness of the inner rubber layer was reduced to 0.15 mm. In addition, in the V-ribbed belt, the thickness of the entire compression rubber layer was 2.8 mm, and the proportion of the thickness of the inner rubber layer to the thickness of the entire compression rubber layer was 5.4%.

[Measurement of Average Thickness of Inner Rubber Layer]

Figure 2:
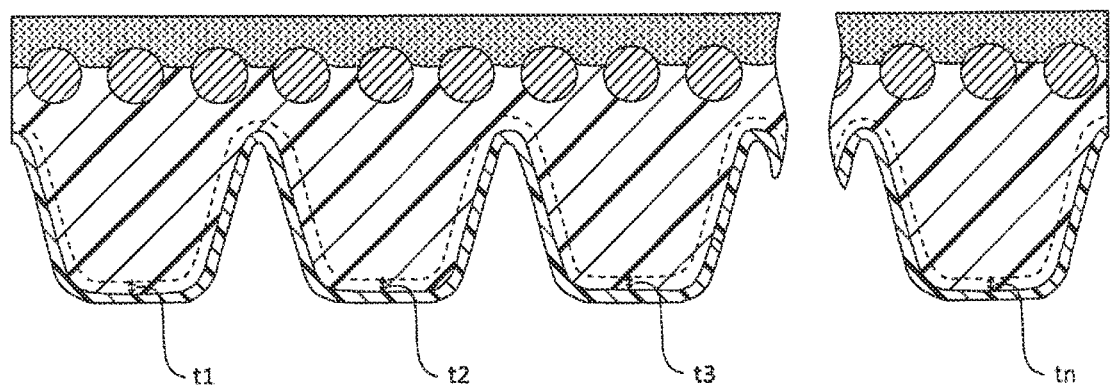
FIG. 2 is a schematic cross-sectional view for illustrating a method of measuring an average thickness of an inner rubber layer in Examples.

The V-ribbed belt was cut in parallel with the belt width direction, and the cut surface was magnified 20 times with a microscope and observed. The thickness of the inner rubber layer at the center of the rib tip in the belt width direction was measured. As shown in FIG. 2 and the following equation, the arithmetic mean of the thicknesses (t1 to tn) of the inner rubber layer measured in all the ribs was obtained and used as the average thickness of the inner rubber layer.

$$\text{Average thickness of inner rubber layer} = +t2+t3+ \ldots +tn)/n$$

(In the equation, n is the number of ribs, which is 6 in the case of the example of the present application.)

[Two-Cord Separating Force]

Figure 4:
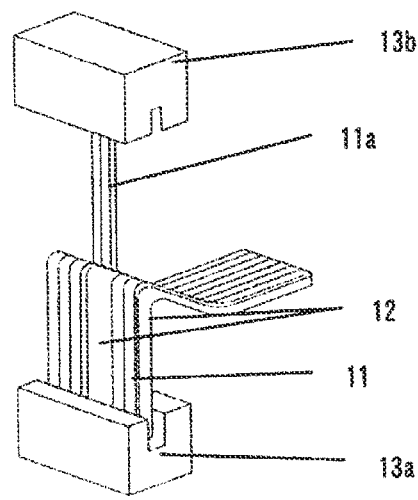
FIG. 4 is a schematic perspective view illustrating a method for measuring a two-cord separating force in Examples.

After the tension layer of the V-ribbed belt was peeled off, as shown in FIG. 4, two adjacent cords 11a among cords 11 adhered to a compression rubber layer 12 were pulled up from the compression rubber layer 12 to prepare a sample for a separating test. The pulled cords 11a was gripped by an upper grip 13b of a tensile tester ("AGS-J10 kN" manufactured by Shimadzu Corporation), and the remaining portion where the cords 11a were pulled was gripped by a lower grip 13a. The upper grip 13b was raised at a speed of 50 mm/min and the tensile force was recorded. A measurement time was 2 minutes. A test temperature (atmospheric temperature) was 23° C., and the sample for the separating test was measured after being left at the test temperature for 3 hours. The tensile force shows a wavy curve, and the average value thereof was determined in accordance with an E method of JIS K6274 (2018). That is, an initial rising curve at a start of the test was ignored, and the average value of the maximum value and the minimum value among all the peaks of the wavy curve was obtained.

[Sound Emission Resistance During Water Injection]

Figure 5:
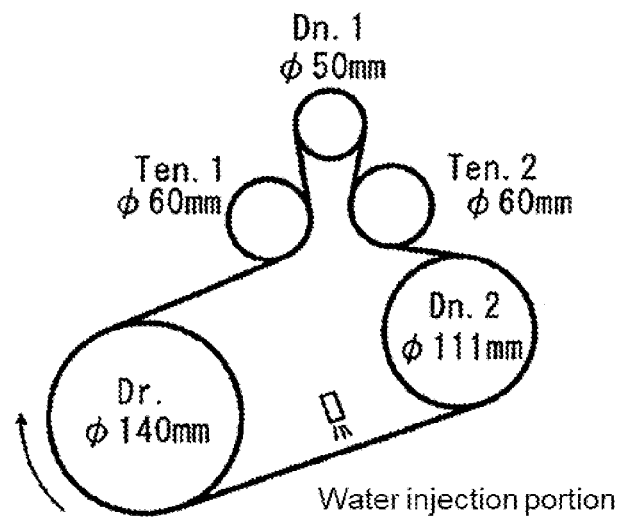
FIG. 5 is a schematic diagram illustrating a layout of a testing machine used in evaluation of sound emission resistance during water injection in Examples.

The belt was run on the testing machine having a layout shown in FIG. 5, and the sound emission resistance during water injection was evaluated. The testing machine included a driving pulley (Dr.) having a diameter of 140 mm, a tension pulley 1 (Ten. 1) having a diameter of 60 mm, a driven pulley 1 (Dn. 1) having a diameter of 50 mm, a tension pulley 2 (Ten. 2) having a diameter of 60 mm, and a driven pulley 2 (Dn. 2) having a diameter of 111 mm. The rotation speed of the driving pulley was varied at 800±160 rpm. The load of the driven pulley 1 was 16 N·m, and the driven pulley 2 was unloaded. The belt tension was set to 200 N/6 ribs. Water was intermittently injected from the compression rubber layer side of the belt at a position at a center between the driving pulley and the driven pulley 2. Water injection was performed once every 60 seconds (for 5 seconds). The amount of water injection was 100 cc/s (500 cc/5 s). The test temperature (atmospheric temperature) was set to 25° C., and the test time was set to 60 minutes. The presence or absence of abnormal noise during the test was confirmed by hearing.

[Durability]

Figure 6:
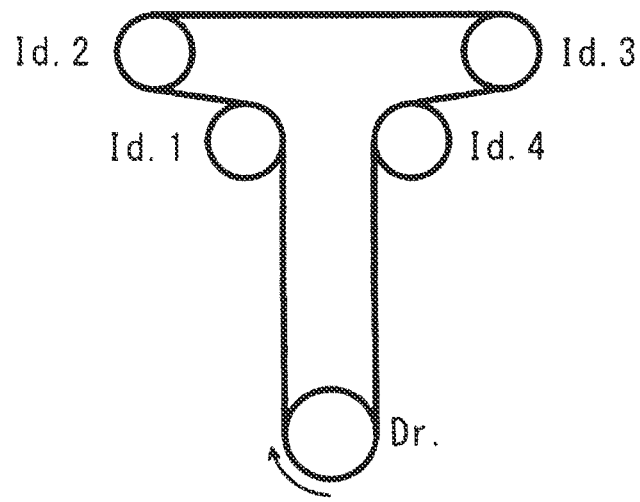
FIG. 6 is a schematic diagram illustrating a layout of a testing machine used in evaluation of durability in Examples.

The belt was run on the testing machine having a layout shown in FIG. 6 and the durability was evaluated. The testing machine includes a driving pulley (Dr.) having a diameter of 60 mm and idler pulleys 1 to 4 (Id.1 to Id.4) having a diameter of 50 mm. The rotation speed of the driving pulley was set to 3,300 rpm. Each idler pulley was unloaded. A tension was applied to the belt by applying an axial load of 588 N to the driving pulley. A test temperature (atmospheric temperature) was set to 130° C., and the test was completed when a failure occurred in the belt.

[Wear Resistance]

Figure 7:
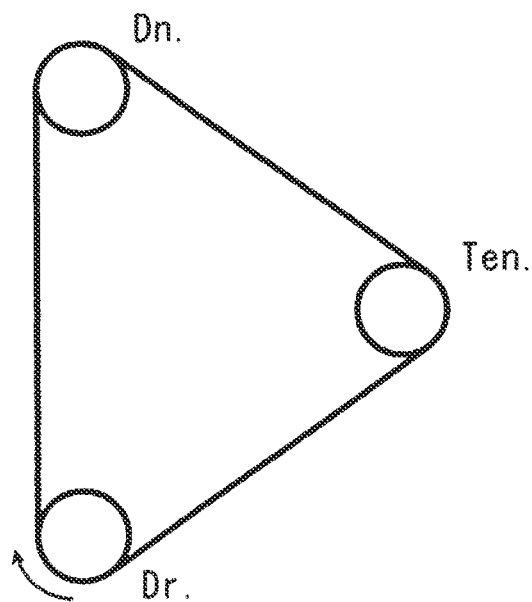
FIG. 7 is a schematic diagram illustrating a layout of a testing machine used in evaluation of wear resistance in Examples.

The belt was run on the testing machine having a layout shown in FIG. 7 and the wear resistance was evaluated. The testing machine includes a driving pulley (Dr.) having a diameter of 60 mm, a driven pulley (Dn.) having a diameter of 60 mm, and a tension pulley (Ten.) having a diameter of 60 mm. A tension was applied to the belt by applying an axial load of 539 N to the tension pulley. By setting the rotation speed of the driving pulley to 2,000 rpm and the rotation speed of the driven pulley to 1,920 rpm, 4% slip was caused between the driving pulley and the driven pulley. The test temperature (atmospheric temperature) was set to 25° C., and the test time was set to 300 hours. The mass of the belt before and after the test was measured, and the wear rate was measured by the following equation.

Wear rate (%)=[(mass of belt before test−mass of belt after test)/mass of belt before test]×100

[Heat Generation Property (Belt Temperature)]

Figure 8:
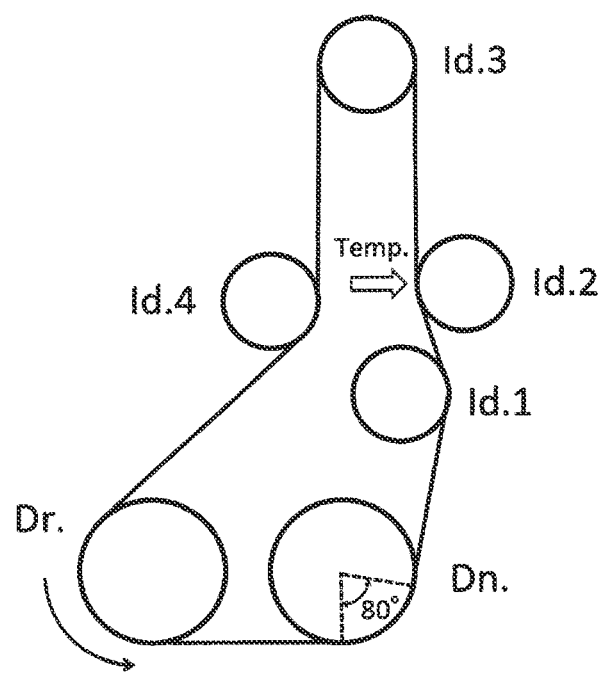
FIG. 8 is a schematic diagram illustrating a layout of a testing machine used in evaluation of heat generation property in Examples.

The belt was run on the testing machine having a layout shown in FIG. 8 and the heat generation property was evaluated. The testing machine includes a driving pulley (Dr.) having a diameter of 120 mm, a driven pulley (Dn.) having a diameter of 120 mm, and idler pulleys 1 to 4 (Id.1 to Id.4) having a diameter of 80 mm. A rotation direction of the driving pulley was the direction (counterclockwise) of the arc-shaped arrow in FIG. 8. A winding angle of the belt on the driven pulley was set to 80°, the belt tension was set to 400 N/6 ribs, and the test temperature (atmospheric temperature) was set to 25° C. The test was started from a state in which the driving pulley was stopped, and the rotation speed of the driving pulley was increased to 1,000 rpm in 10 seconds from the start of the test, and thereafter, the rotation speed was kept constant at 1000 rpm. The load of the driven pulley was set to no load until 20 seconds from the start of the test, and thereafter, the load was set to infinity to stop the rotation of the pulley (the driven pulley was locked). At 60 seconds after the driven pulley was locked (80 seconds after the start of the test), the temperature of the inner peripheral surface of the V-ribbed belt was measured at a position of an idler pulley 2 using a non-contact thermometer ("THI-500" manufactured by Ichinen TASCO Co., Ltd.).

The evaluation results are shown in Table 2.

TABLE 2

| | Example | | | | | | | |
|---|---|---|---|---|---|---|---|---|
| | 1 | 2 | 3 | 4 | 5 | 6 | 7 | 8 |
| Outer rubber layer formulation | R2 | R2 | R2 | R2 | R2 | R2 | R2 | R2 |
| Inner rubber layer formulation | R3 | R4 | R5 | R6 | R7 | R8 | R9 | R10 |
| Two-cord separating force (N) | 13.1 | 12.8 | 12.9 | 12.7 | 12.8 | 12.8 | 12.9 | 12.8 |
| Sound emission resistance during water injection | No sound | No sound | No sound | No sound | No sound | No sound | No sound | No sound |
| Durability (life time and failure type) | 265 hr crack | 255 hr crack | 246 hr crack | 226 hr crack | 254 hr crack | 251 hr crack | 229 hr crack | 200 hr crack |
| Wear resistance (wear rate) | 4.1% | 4.2% | 4.6% | 4.7% | 4.3% | 4.9% | 4.2% | 4.1% |
| Belt temperature (° C.) | 320 | 330 | 310 | 320 | 320 | 340 | 330 | 290 |

| | Comparative Example | | | | | |
|---|---|---|---|---|---|---|
| | 1 | 2 | 3 | 4 | 5 | 6 |
| Outer rubber layer formulation | R3 | R2 | R2 | R2 | R2 | R2 |
| Inner rubber layer formulation | R3 | R2 | R11 | R12 | R13 | R14 |
| Two-cord separating force (N) | 7.6 | 12.9 | 12.8 | 12.7 | 12.9 | 12.8 |

TABLE 2-continued

| | | | | | | |
|---|---|---|---|---|---|---|
| Sound emission resistance during water injection | No sound | No sound | abnormal noise | No sound | No sound | abnormal noise |
| Durability (life time and failure type) | 72 hr pop out | 177 hr crack | 226 hr crack | 136 hr crack | 153 hr crack | 128 hr crack |
| Wear resistance (wear rate) | 5.2% | 7.3% | 5.0% | 7.7% | 8.1% | 8.5% |
| Belt temperature (° C.) | 320 | 380 | 340 | 320 | 370 | 310 |

As is clear from the results in Table 2, Comparative Example 1 is an example in which the compression rubber layer was a single layer and the rubber composition of R3 was used, and the two-cord separating force was low, and pop out (a phenomenon in which the cord pops out from the side surface of the belt) occurred in 72 hours in the durability test. Comparative Example 2 is an example in which the compression rubber layer was a single layer and the rubber composition of R2 was used, and in the durability test, cracks occurred in 177 hours, and the wear resistance was also low.

On the other hand, in Examples 1 to 8 in which the compression rubber including two layers was provided and the inner rubber layer was formed of a cured product of a rubber composition containing a hydrophilic plasticizer, an unsaturated carboxylic acid metal salt, and polyolefin particles, all of the sound emission resistance during water injection, the durability, and the wear resistance were high, and good results were obtained. Among these, Examples 1 to 7 were excellent in balance of various properties, but Example 8 was slightly lower in durability (crack resistance) than those of Examples 1 to 7 because the proportion of polyolefin particles was too large.

Comparative Example 3 is an example in which a non-hydrophilic plasticizer was used instead of the hydrophilic plasticizer as compared with Example 1, and the sound emission resistance during water injection was lowered. Comparative Example 4 is an example in which the unsaturated carboxylic acid metal salt was removed as compared with Example 1, and the durability and the wear resistance were lowered. Comparative Example is an example in which the polyolefin particles were removed as compared with Example 1, and the durability and the wear resistance were lowered. In Comparative Example 6, since the hydrophilic plasticizer and the unsaturated carboxylic acid metal salt were not contained, both the sound emission resistance during water injection and the wear resistance were low.

In the heat generation test (belt temperature), in Comparative Examples 2 and 5 in which R2 and R13 containing no polyolefin particles in the inner rubber layer were used, the belt temperature was particularly high. From these results, it can be estimated that the inclusion of the polyolefin particles in the inner rubber layer has an effect of preventing an increase in the belt temperature when the pulley was locked. The lower the belt temperature in the heat generation test, the higher the effect of preventing heat generation even when the pulley was locked or the belt slips due to excessive load. Therefore, deterioration of the rubber can be prevented by preventing heat generation, and the durability of the frictional power transmission belt can also be improved.

Although the present invention has been described in detail with reference to a specific embodiment, it is obvious to those skilled in the art that various changes and modifications may be made without departing from the gist and the scope of the invention.

This application is based on Japanese Patent Application No. 2019-193675 filed on Oct. 24, 2019 and Japanese Patent Application No. 2020-156394 filed on Sep. 17, 2020, contents of which are incorporated by reference herein.

INDUSTRIAL APPLICABILITY

The frictional power transmission belt of the present invention can be used in combination with a pulley as a power transmission belt in various fields such as automobiles, motorcycles, snow vehicles, industrial machines, and agricultural machines (including large agricultural machines). The frictional power transmission belt is particularly useful as a frictional power transmission belt (particularly, V-ribbed belt) for driving an auxiliary machine of an automobile because of being capable of reducing the torque loss and having high durability even in power transmission under high load.

REFERENCE SIGNS LIST

1: frictional power transmission belt (V-ribbed belt)
2: tension rubber layer
3: compression rubber layer
3a: inner rubber layer
3b: outer rubber layer
4: cord
5: rib portion
6: knitted fabric

The invention claimed is:

1. A frictional power transmission belt comprising a compression rubber layer having a frictional power transmission surface that is covered with a fabric, the compression rubber layer comprising an inner rubber layer in contact with the fabric and an outer rubber layer on an outer peripheral side of the inner rubber layer,
   wherein the inner rubber layer is formed of a cured product of a rubber composition comprising a surfactant as a hydrophilic plasticizer, an unsaturated carboxylic acid metal salt, and polyolefin particles, and
   a proportion of the unsaturated carboxylic acid metal salt is 2 to 10 parts by mass with respect to 100 parts by mass of a rubber component forming the inner rubber layer, and
   wherein the inner rubber layer further comprises a metal oxide and a content of the surfactant is 20-200 parts by mass per 100 parts by mass of the metal oxide.

2. The frictional power transmission belt according to claim 1, wherein the fabric comprises a cellulose-based fiber.

3. The frictional power transmission belt according to claim 1, wherein the polyolefin particles comprise ultra-high molecular weight polyethylene particles.

4. The frictional power transmission belt according to claim 1, wherein a thickness ratio of the inner rubber layer to the entire compression rubber layer is 1% to 50%.

5. The frictional power transmission belt according to claim 1, further comprising a cord extending in a longitudinal direction of a belt body, wherein a tensile elastic modulus of fibers constituting the cord is 50 GPa or more.

6. The frictional power transmission belt according to claim 5, wherein the cord is formed of at least one of an aramid fiber and a carbon fiber.

7. The frictional power transmission belt according to claim 1, wherein the outer rubber layer does not comprise polyolefin particles.

8. The frictional power transmission belt according to claim 1, which is a V-ribbed belt.

9. The frictional power transmission belt according to claim 1, wherein a proportion of the polyolefin particles is 2 to 35 parts by mass with respect to 100 parts by mass of a rubber component forming the inner rubber layer.

10. The frictional power transmission belt according to claim 1, wherein a proportion of the hydrophilic plasticizer is 1 to 10 parts by mass with respect to 100 parts by mass of a rubber component forming the inner rubber layer.

11. The frictional power transmission belt according to claim 1, wherein the rubber component forming the inner rubber layer is an ethylene-α-olefin elastomer.

12. The frictional power transmission belt according to claim 1, wherein the fabric is impregnated with a resorcin-formalin-latex liquid.

13. The frictional power transmission belt according to claim 1, wherein the inner rubber layer has a thickness of 0.1 mm to 0.25 mm.

14. A method for producing a frictional power transmission belt, the method comprising:
disposing, on a cylindrical inner mold disposed in a hollow cylindrical outer mold, an unvulcanized laminate including an unvulcanized rubber sheet for a compression rubber layer and a fabric laminated on the unvulcanized rubber sheet so that the fabric is directed toward the outer mold;
pressurizing the unvulcanized laminate at least toward the outer mold to vulcanize the unvulcanized laminate; and
demolding a molded body of the vulcanized rubber sheet and the fabric to produce a frictional power transmission belt having a predetermined form,
wherein the unvulcanized rubber sheet is formed of an unvulcanized rubber sheet for an inner rubber layer in contact with the fabric and an unvulcanized rubber sheet for an outer rubber layer on an outer peripheral side of the unvulcanized rubber sheet for the inner rubber layer,
the unvulcanized rubber sheet for the inner rubber layer is formed of a rubber composition comprising a surfactant as a hydrophilic plasticizer, an unsaturated carboxylic acid metal salt, and polyolefin particles,
a proportion of the unsaturated carboxylic acid metal salt is 2 to 10 parts by mass with respect to 100 parts by mass of a rubber component forming the inner rubber layer, and
wherein the inner rubber layer further comprises a metal oxide and a content of the surfactant is 20-200 parts by mass per 100 parts by mass of the metal oxide.

15. The production method according to claim 14, wherein the unvulcanized laminate is pressurized and vulcanized at a pressure of 1.2 MPa or more.

16. The production method according to claim 14, wherein the unvulcanized rubber sheet for the compression rubber layer is prepared by rolling an unvulcanized rubber sheet with a calender roll to form the unvulcanized rubber sheet for the inner rubber layer to be in contact with the fabric, and laminating the unvulcanized rubber sheet for the inner rubber layer with the unvulcanized rubber sheet for the outer rubber layer on the calender roll.

17. The production method according to claim 14, comprising:
disposing the unvulcanized laminate which is a hollow cylindrical or sleeve-shaped unvulcanized laminate comprising:
an unvulcanized rubber laminated sheet for forming a belt body at least including the unvulcanized rubber sheet for the compression rubber layer and an unvulcanized rubber sheet for a tension rubber layer laminated or disposed on one surface of the unvulcanized rubber sheet for the compression rubber layer;
a cord embedded in a longitudinal direction of the unvulcanized rubber laminated sheet; and
the fabric which is a knitted fabric laminated or disposed on the other surface of the unvulcanized rubber sheet for the compression rubber layer, so that the knitted fabric is directed toward a rib mold of the outer mold; and
pressurizing and vulcanizing the unvulcanized laminate with an expansion pressure of a flexible jacket that is mounted on the inner mold and is expandable and contractable.

18. The production method according to claim 14, wherein the fabric is impregnated with a resorcin-formalin-latex liquid.

19. The production method according to claim 14, wherein the inner rubber layer has a thickness of 0.1 mm to 0.25 mm.

* * * * *